(12) United States Patent
McCutchen et al.

(10) Patent No.: US 8,771,499 B2
(45) Date of Patent: Jul. 8, 2014

(54) ELECTROHYDRAULIC AND SHEAR CAVITATION RADIAL COUNTERFLOW LIQUID PROCESSOR

(75) Inventors: Wilmot H. McCutchen, Orinda, CA (US); David J. McCutchen, Portland, OR (US)

(73) Assignee: McCutchen Co., Portland, OR (US)

( * ) Notice: Subject to any disclaimer, the term of this patent is extended or adjusted under 35 U.S.C. 154(b) by 137 days.

(21) Appl. No.: 13/589,917

(22) Filed: Aug. 20, 2012

(65) Prior Publication Data
US 2012/0318671 A1    Dec. 20, 2012

Related U.S. Application Data

(60) Division of application No. 12/234,541, filed on Sep. 19, 2008, now Pat. No. 8,268,136, which is a continuation-in-part of application No. 12/004,308, filed on Dec. 20, 2007, now Pat. No. 7,757,866, application No. 13/589,917, which is a continuation-in-part of application No. 12/167,771, filed on Jul. 3, 2008.

(60) Provisional application No. 61/034,242, filed on Mar. 6, 2008.

(51) Int. Cl.
*C02F 1/461* (2006.01)

(52) U.S. Cl.
USPC .......................... 205/751; 205/742; 205/755

(58) Field of Classification Search
CPC ...... B01D 9/0022; B01D 9/00; B01D 9/0018; B01J 19/088; B01J 19/087; B01J 19/1806; C02F 1/4608; C02F 1/4604; C02F 1/461; C02F 1/46
USPC ........... 205/742–761; 204/660, 668–669, 545
See application file for complete search history.

(56) References Cited

U.S. PATENT DOCUMENTS

| | | | |
|---|---|---|---|
| 406,968 | A | 7/1889 | Tesla |
| 3,366,564 | A | 1/1968 | Allen |
| 3,464,672 | A | 9/1969 | Massa |
| 3,465,187 | A | 9/1969 | Breaux |
| 3,915,673 | A | 10/1975 | Tamai et al. |

(Continued)

OTHER PUBLICATIONS

Bockris, J., et al., "On the Splitting of Water," Int. J. Hydrogen Energy, vol. 10, No. 30, pp. 179-201, 1985, Pergamon Press Ltd., Great Britain.

(Continued)

*Primary Examiner* — Nicholas A Smith
*Assistant Examiner* — Brian W Cohen
(74) *Attorney, Agent, or Firm* — Marger Johnson & McCollom, P.C.

(57) ABSTRACT

Axially fed fluid is sheared during long residence time in a radial workspace between counter-rotating coaxial disk-shaped centrifugal impellers. Gases evolve in the fractal turbulence of a shear layer, which is forced between laminar boundary layers, and an axial suction pump axially extracts evolved noncondensables and volatiles through cores of radial vortices in the shear layer. Cavitation due to shear between the impellers kills pathogens by shock waves, microjets, OH radicals, and nearby UV light pulses. Oppositely charged electrodes bounding the workspace cause electroporesis and electrohydraulic cavitation. The electrodes are counter-rotating ridged armatures of disk dynamos, forming a dynamic capacitor having audio frequency pulsed electric fields. Electrode erosion by arcing is prevented by shear between the electrodes.

3 Claims, 10 Drawing Sheets

(56) References Cited

U.S. PATENT DOCUMENTS

| | | |
|---|---|---|
| 3,944,865 A | 3/1976 | Jewitt |
| 3,990,631 A | 11/1976 | Schall |
| 4,044,943 A | 8/1977 | Brown et al. |
| 4,076,617 A | 2/1978 | Bybel et al. |
| 4,125,439 A | 11/1978 | Fleischmann et al. |
| 4,184,084 A | 1/1980 | Crehore |
| 4,186,089 A | 1/1980 | Okada |
| 4,201,635 A | 5/1980 | Muller |
| 4,292,051 A | 9/1981 | Kime |
| 4,454,101 A | 6/1984 | Garrison et al. |
| 4,458,153 A | 7/1984 | Wesley |
| 4,792,438 A | 12/1988 | Horikoshi |
| 4,832,918 A | 5/1989 | Horikoshi et al. |
| 4,846,780 A | 7/1989 | Galloway et al. |
| 4,925,557 A | 5/1990 | Ahlberg, Jr. et al. |
| 4,957,606 A | 9/1990 | Juvan |
| 4,992,246 A | 2/1991 | Serizawa et al. |
| 5,143,630 A | 9/1992 | Rolchigo |
| 5,232,726 A | 8/1993 | Clark et al. |
| 5,254,250 A | 10/1993 | Rolchigo et al. |
| 5,368,724 A | 11/1994 | Ayers et al. |
| 5,390,740 A | 2/1995 | Woerheide |
| 5,393,417 A | 2/1995 | Cox |
| 5,393,421 A | 2/1995 | Ohe |
| 5,451,825 A | 9/1995 | Strohm |
| 5,464,513 A | 11/1995 | Goriachev et al. |
| 5,481,149 A | 1/1996 | Kambe et al. |
| 5,494,585 A | 2/1996 | Cox |
| 5,534,118 A | 7/1996 | McCutchen |
| 5,578,280 A | 11/1996 | Kazi et al. |
| 5,587,618 A | 12/1996 | Hathaway |
| 5,607,562 A | 3/1997 | Shimamune et al. |
| 5,679,249 A | 10/1997 | Fendya et al. |
| 5,688,377 A | 11/1997 | McCutchen |
| 5,725,778 A | 3/1998 | Cho et al. |
| 5,746,789 A | 5/1998 | Wright et al. |
| 5,817,218 A | 10/1998 | Hayashi et al. |
| 5,851,375 A | 12/1998 | Bodger et al. |
| 5,851,407 A | 12/1998 | Bowman et al. |
| 5,882,530 A | 3/1999 | Chase et al. |
| 5,925,324 A | 7/1999 | Greer |
| 5,939,030 A | 8/1999 | Moxley et al. |
| 5,993,674 A | 11/1999 | Rolchigo et al. |
| 6,019,825 A | 2/2000 | Greene et al. |
| 6,051,905 A | 4/2000 | Clark |
| 6,106,713 A | 8/2000 | Miller et al. |
| 6,117,322 A | 9/2000 | Miller et al. |
| 6,149,573 A | 11/2000 | Berger et al. |
| 6,200,486 B1 | 3/2001 | Chahine et al. |
| 6,210,575 B1 | 4/2001 | Chase et al. |
| 6,221,260 B1 | 4/2001 | Chahine et al. |
| 6,245,299 B1 | 6/2001 | Shiloh et al. |
| 6,254,764 B1 | 7/2001 | Babington et al. |
| 6,261,525 B1 | 7/2001 | Minaee |
| 6,264,898 B1 | 7/2001 | Ingram |
| 6,284,105 B1 | 9/2001 | Eliasson et al. |
| 6,376,558 B1 | 4/2002 | Bahner et al. |
| 6,451,175 B1 | 9/2002 | Lal |
| 6,468,499 B1 | 10/2002 | Balachandran et al. |
| 6,478,969 B2 | 11/2002 | Brantley et al. |
| 6,515,391 B2 | 2/2003 | Whitesell |
| RE38,130 E | 6/2003 | Adams |
| 6,603,233 B2 | 8/2003 | Strohm |
| 6,685,803 B2 | 2/2004 | Lazarovich |
| 6,716,269 B1 | 4/2004 | Graff |
| 6,716,335 B2 | 4/2004 | Takesako et al. |
| H2102 H | 5/2004 | Uhm |
| 6,737,099 B2 | 5/2004 | Guraya |
| 6,746,613 B2 | 6/2004 | Korenev |
| 6,774,335 B2 | 8/2004 | Yanobe et al. |
| 6,777,639 B2 | 8/2004 | Schroder et al. |
| 6,808,634 B1 | 10/2004 | Zegg |
| 6,827,820 B1 | 12/2004 | Meinander |
| 6,872,301 B2 | 3/2005 | Schepis |
| 6,875,351 B2 | 4/2005 | Arnaud |
| 6,916,418 B2 | 7/2005 | Baldasarre et al. |
| 6,916,425 B2 | 7/2005 | Lotz et al. |
| 6,923,890 B2 | 8/2005 | Ricatto et al. |
| 6,924,608 B2 | 8/2005 | Czernichowski et al. |
| 6,966,874 B2 | 11/2005 | Cornay et al. |
| 7,008,605 B1 | 3/2006 | Benavides |
| 7,029,584 B2 | 4/2006 | Blase et al. |
| 7,033,478 B2 | 4/2006 | Harde |
| 7,033,481 B1 | 4/2006 | Schlager et al. |
| 7,037,484 B1 | 5/2006 | Brandenburg |
| 7,041,144 B2 | 5/2006 | Kozyuk |
| 7,049,724 B2 | 5/2006 | Qu et al. |
| 7,052,667 B2 | 5/2006 | Loutfy et al. |
| 7,056,437 B2 | 6/2006 | Schmid et al. |
| 7,094,381 B1 | 8/2006 | Overton et al. |
| 7,097,676 B2 | 8/2006 | Wootan et al. |
| 7,128,816 B2 | 10/2006 | Denes et al. |
| 7,160,426 B2 | 1/2007 | Baosheng |
| 7,169,305 B2 | 1/2007 | Gomez |
| 7,183,515 B2 | 2/2007 | Miller et al. |
| 7,241,256 B2 | 7/2007 | Cornay et al. |
| 7,244,360 B2 | 7/2007 | Cho |
| 7,247,244 B2 | 7/2007 | Kozyuk |
| 7,262,384 B2 | 8/2007 | Jackson |
| 7,264,849 B2 | 9/2007 | Keshner et al. |
| 7,306,737 B2 | 12/2007 | Langenecker |
| 7,314,516 B2 | 1/2008 | Kozyuk et al. |
| 7,374,693 B1 | 5/2008 | Routberg et al. |
| 7,381,328 B2 | 6/2008 | Schrive et al. |
| 7,419,603 B2 * | 9/2008 | Cho ............................ 210/712 |
| 7,771,582 B2 | 8/2010 | Kazem |
| 7,883,580 B2 | 2/2011 | Barker et al. |
| 2004/0007539 A1 | 1/2004 | Denes et al. |
| 2004/0144314 A1 | 7/2004 | David et al. |
| 2005/0163696 A1 | 7/2005 | Uhm et al. |
| 2006/0146644 A1 | 7/2006 | Holloway et al. |
| 2006/0244386 A1 | 11/2006 | Hooke et al. |
| 2007/0001462 A1 | 1/2007 | McNeil |
| 2007/0045168 A1 | 3/2007 | Levitt et al. |
| 2007/0048209 A1 | 3/2007 | Smalley et al. |
| 2007/0183959 A1 | 8/2007 | Charlier et al. |
| 2008/0023338 A1 | 1/2008 | Stoots et al. |

OTHER PUBLICATIONS

Hawkes, G., et al., INL/CON-06-11720 Preprint, "Three Dimensional CFD Model of a Planar Solid Oxide Electrolysis Cell for Co-Electrolysis of Steam and Carbon Dioxide," Nov. 2006, Idaho National Laboratory, Idaho, US, including 2 pg. INL flyer entitled Syntrolysis.

Indarto, A., "Kinetic of CO2 Reduction by Gliding Arc Plasma," Asian Journal of Water, Environment and Pollution, vol. 4, No. 1, pp. 191-194, Oct. 9, 2006.

Koziol, K., et al., "High-Performance Carbon Nantube Fiber," Science, vol. 318, pp. 1892-1895, Dec. 21, 2007.

Lee, S.J., et al., "Large scale synthesis of carbon nanotubes by plasma rotating arc discharge technique," Diamond and Related Materials 11, pp. 914-917, 2002, Elsevier Science B.V.

Perlmutter, Comparison of Gypsum Dewatering Technologies at Flue Gas Desulfurization Plants, Presented at the 45th ISA Power Industry Division (POWID) Conference San Diego, California Jun. 2-7, 2002, 9 pgs.

Tarrer, Development of a New Gravity Sedimentation Process for Dewatering Flue Gas Cleaning Wastes, EPA-600/S7-84-084, Sep. 1984, 5 pgs.

Notification of Transmittal of the International Search Report and the Written Opinion of the International Searching Authority, or the Declaration, Feb. 9, 2009, PCT/US08/85916, 13 pages.

Keider, et al., "On the Conditions of Carbon Nanotube Growth in the Arc Discharge," Nanotechnology vol. 15 Issue 11, Oct. 1, 2004, pp. 1571-1575.

Nojeh, A., et al., "Electric-Field-Directed Growth of Carbon Nanotubes in Two Dimensions", Journal of Vacuum Science & Technology B, vol. 22 Issue 6, 2004, pp. 3421-3425, American Vacuum Society.

(56) References Cited

OTHER PUBLICATIONS

Oon, C.H., et al., "In Situ nanowire growth for electrical interconnects", Nanotechnology, 2004, vol. 15 No. 5, pp. 687-691.

Britt, Robert Roy, "The Worlds Smallest Motor," Apr. 12, 2005, retrieved at http://www.livescience.com/6969-world-smallest-motor.html.

Kalra, C.S. et al., "Gliding arc in tornado using a reverse vortex flow," Review of Scientific Instruments 76, 025110, pp. 1-7, Jan. 21, 2005, American Institute of Physics.

Hinkov, S., et al., "Optical Plasma Control During Arc Carbon Nanotube Growth" 2001, Proceedings of the Sixth Applied Diamond Conference/Second Frontier Carbon Technology Joint Conference (ADC/FCT 2001).

Chen, J. et al., "Fractal-like free networks Increasing the permeability," Physical Review E 75, 056301 (2007) pp. 1-8.

Zandbergen, P., Dijkstra D., "Von Karman Swirling Flows," Annual Reviews Fluid Mech. (1987), 19:465-491.

Hnatiuc, E. et al., "Cold Plasma Electrochemical Reactor with Rotary Discharge," retrieved at http://www.ut.ee/hakone8/papers/T6/Hnatiuc1(TP).pdf, Jul. 31, 2003, pp. 181-198.

Czernichowski, A., "GlidArc Assisted Preparation of the Synthesis Gas from Natural and Waste Hydrocarbons Gases," Oil & Gas Science Technology—Rev. IFP, vol. 56 No. 2 (2001), pp. 181-198.

Tesla, N., "Notes on a Unipolar Dynamo," The Electrical Engineer, Sep. 2, 1891, pp. 23-26.

Young, I., et al., "Physical Water Treatment for the Mitigation of Mineral Fouling in Cooling-Tower Water Applications," 2003 ECI Conference on Heat Exchanger Fouling and Cleaning: Fundamental Applications (2004), pp. 20-31.

Kronenberg, K., "Experimental Evidence for Effects of Magnetic Fields on Moving Water," IEEE Transactions on Magnetics, vol. MAG-21, No. 5, Sep. 1985 pp. 2059-2061.

Lebovka, N., Vorobiev, E., "The kinetics of inactivation of spheroidal microbial cells by pulsed electric fields," arXiv 0704.2750v1, Apr. 20, 2007, pp. 1-22.

Khachatryan, A., et al., "Graphite-to-diamond transformation induced by ultrasound cavitation," Diamond & Related Materials 17 (2008), pp. 931-936.

Van Der Walt, E., Grundingh, M., "The use of UV in combination with physical unit processes for treatment of raw water in small or rural communities," retrieved at www.svargo-us.org, Nov. 18, 2007, pp. 1-6.

Neff, R., "Applying magneto-hydrodynamic physics to water purification," IBM Innovation to Be Greener Competition, The National Society of High school Scholars, Apr. 30, 2008, pp. 1-7.

Flannigan, D. et al., "Sonochemistry and sonoluminescense in ionic liquids, molten salts, and concentrated electrolyte solutions," Journal of Organometallic Chemistry 690 (2005), pp. 3513-3517.

UOP, "FCC Vortex Separation Technology: the VDS (TM) Design," retrieved at www.uop.com (2003) pp. 1-3.

Konno, A., et al., "Observation of cavitation bubble collapse by high-speed video," retrieved at www.fluid.mech.kogakuin.ac.jp, Dec. 11, 2003, pp. 1-6.

Rosa, E., "Cavitation pressure of water," http://matdl.org/repository/list.php?cat=quick_filter&search_keysc%5B0%5D=cavitation+pressure (2007), pp. 1-3.

Leszcynska, D., Ahmad H., "Toxic elements in soil and groundwater: Short-term study on electrokinetic removal of arsenic in the presense of other ions," International Journal of Environmental Research and Public Health (2006), pp. 196-201.

Kim, S., et al., "Seed crystalization with cavitation for enhanced removal of calcium in water," J. Ind. Eng. Chem, vol. 13, No. 1 (2007), pp. 79-83.

Loske, A., et al., "Bactericidal effect of underwater shock waves," retrieved at http://www.sea-acustica.es/Sevilla02/ult01012, Sep. 2002, pp. 1-5.

Daniels, D., "Put a lid on rising chemical costs," Power, Sep. 15, 2008. pp. 1-9.

Gupta, S., "Investigation of a physical disinfection process based on pulsed underwater corona discharges," retrieved at FZKA 7336 digbib.ubka.uni-karlsruhe.de/volitexte/documetns/23373.pdf, Sep. 2007, pp. 1-135.

Schtern, V., Hussain, F., "Collapse, Symmetry, Breaking and Hysteresis in Swirling Flows," Annu. Rev. Fluid Mech. (1999) 31:537-566.

Extended European Search Report from related European Patent Application No. 09 717 985.7, issued Oct. 4, 2013, 4 pages, European Patent Office, The Hague, Netherlands.

* cited by examiner

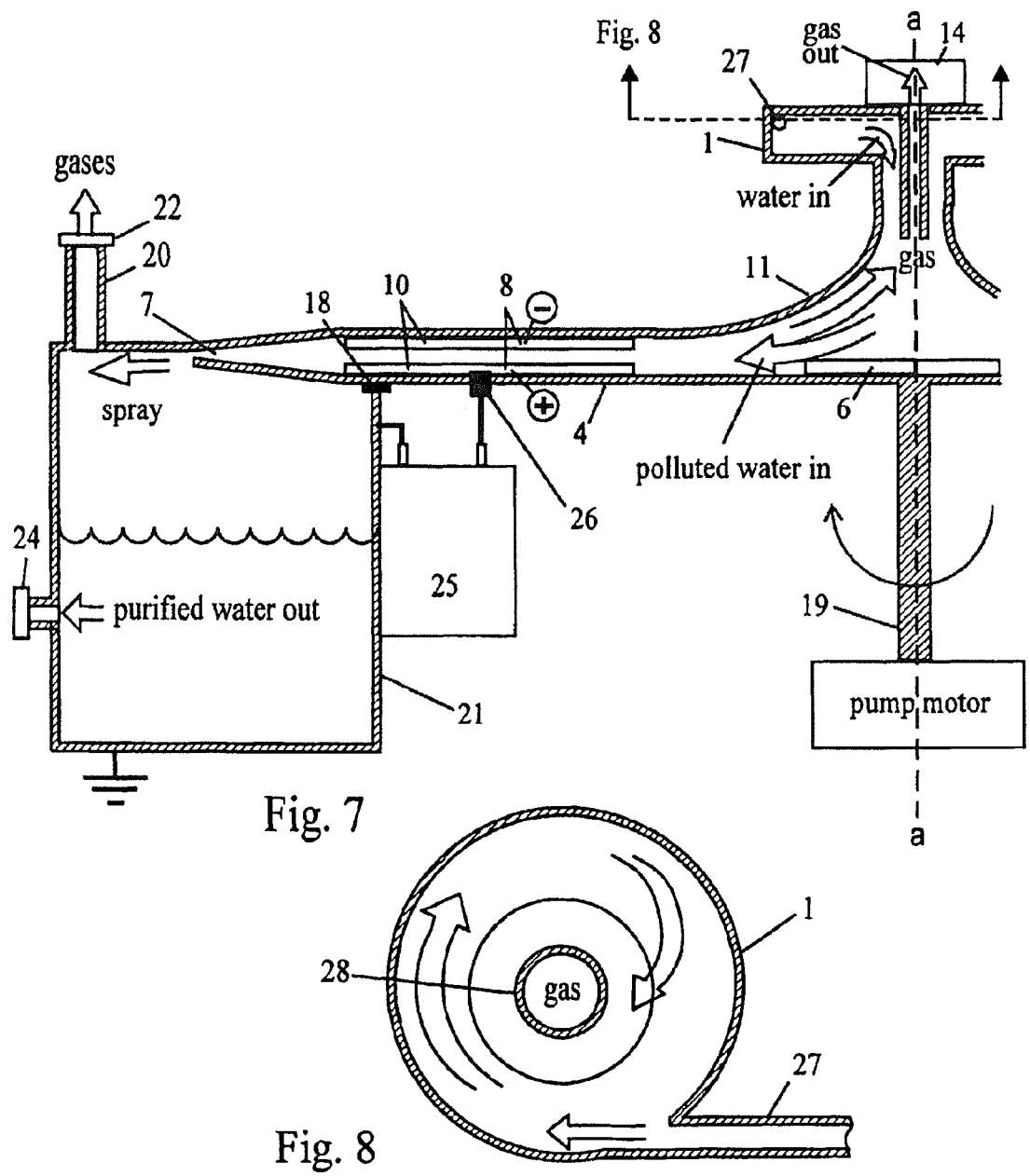

ELECTROHYDRAULIC AND SHEAR CAVITATION RADIAL COUNTERFLOW LIQUID PROCESSOR

APPLICATION HISTORY

This application is a division of U.S. patent application Ser. No. 12/234,541 entitled "Electrohydraulic and Shear Cavitation Radial Counterflow Liquid Processor" filed Sep. 19, 2008, now U.S. Pat. No. 8,268,136; issued Sep. 18, 2012, which is a continuation in part of U.S. patent application Ser. No. 12/004,308 entitled "Rotary Annular Crossflow Filter, Degasser, and Sludge Thickener" filed Dec. 20, 2007 by Wilmot H. McCutchen now U.S. Pat. No. 7,757,866; issued Jul. 20, 2010. It is also a continuation in part of co-pending U.S. patent application Ser. No. 12/167,771 entitled "Radial Counterflow Shear Electrolysis" filed Jul. 3, 2008 by Wilmot H. McCutchen and David J. McCutchen, which claims the benefit of Provisional Application No. 61/034,242 entitled "Dual Disk Dynamo Reactor" filed Mar. 6, 2008 by Wilmot H. McCutchen and David J. McCutchen, the disclosure of which is herein incorporated by reference in its entirety.

BACKGROUND OF THE INVENTION

Field of the Invention

The present invention relates to reactors for physical disinfection, suspended metals extraction, scale and salt crystallizing, and degassing of volatile compounds and dissolved noncondensables. It also relates to atomizers, to liquid processing devices comprising means for pulsed electric fields, and to field water purification without chemicals or membranes.

Degassing

The extraction of dissolved gases and volatile compounds from water is called degassing or stripping. Degassing is important for high energy cavitation because noncondensable gases in cavitation bubbles acts as a cushion, absorbing energy in compression and thereby impeding a rapid and energetic implosion to produce shock waves and microjets. An object of the present invention is to provide upstream degassing means for cavitation processes, including electrohydraulic cavitation and shear cavitation.

Pulsed electric fields assist in degassing by causing streamers to propagate in the water, forming cavitation bubbles wherein dissolved gases evolve. An object of the present invention is to provide means for enhancing cavitation processes and degassing by improved means for pulsed electric fields, comprising shearing electrodes.

Degassing is also an important treatment step in pollution abatement, and another object of the present invention is to provide non-chemical and easily scalable means for degassing large flows of process water or wastewater. Degassing includes stripping of volatile compounds and noncondensables, and also includes cracking of volatile compounds and noncondensables. The object of degassing is to remove or change the gaseous constituents of a flow.

Process water may contain volatile compounds, or odorants, such as ammonia, acetone, methylethylketone (MEK), and volatile organic compounds (VOCs). The odorants must either be stripped out or cracked before further use of the water or its discharge to the environment. Preferably, the degassed water should also be cooled before further use. Therefore, atomization, which provides increased surface area for evaporative cooling and for residual dissolved gas evolution, is desirable in process water treatment, and an object of the present invention is to provide dynamic shear atomizing means for process water and wastewater.

Municipal wastewater may comprise dissolved noncondensable gases, including hydrogen sulfide ($H_2S$, commonly known as sewer gas), dissolved residual chlorine ($Cl_2$) from chlorination, ammonia ($NH_3$), methane ($CH_4$), nitrous oxide ($N_2O$), and nitrogen ($N_2$). In addition, there may be VOCs, including cyanide species, which must be extracted before discharge to the environment or recycling. The volume of municipal wastewater streams (typically hundreds of millions of liters per day) presents a daunting challenge, and excludes complicated low-flow devices and methods that depend on adding and mixing in chemicals to react with the dissolved gases. Biological methods, such as using microorganisms to convert ammonia to nitrogen gas, require very large investment and a large footprint, and they only work on one gas. Wastewater reclamation cannot be feasible unless the gas stripping problem can be solved by an inexpensive and high-throughput mechanical degassing device. Meeting that need is an object of the present invention.

Ammonia in discharges of wastewater has been linked to decline of fish populations, but tertiary treatment to remove ammonia is prohibitively expensive. Sacramento, Calif., estimates it will cost $1 billion to upgrade their wastewater treatment, which discharges 146 million gallons per day, to remove the ammonia that is killing the fish in the Sacramento River Delta. Ammonia is a cyanide precursor, and a strong odorant.

Residual dissolved chlorine from conventional disinfection may combine with organic matter in the environment to produce carcinogenic disinfection by products (DBPs). DBPs have been implicated in rectal cancer, bladder cancer, miscarriage, birth defects, and fetal growth restriction. A need exists to move away from the use of chlorine as a disinfectant and to extract residual chlorine from effluent, and the present invention addresses that need.

Methane is of recent concern for wastewater treatment plants because it is a potent greenhouse gas, 23 times more potent than carbon dioxide, and because its capture and combustion in power generators increases the energy efficiency of the plant. Another reason to extract methane from wastewater is that methane combines with ammonia in wastewater to form hydrocyanic acid (also known as prussic acid, the active ingredient in the Nazi death camp poison gas Zyklon B). Commercial cyanide synthesis (for example, the BMA process) by combining methane and ammonia is well known.

Cyanide is the anion CN—. Hydrogen cyanide (HCN) is a poison. The boiling point of hydrogen cyanide is 26° C., which makes it highly volatile, such that it can be separated from water by low pressure, which causes HCN to become a gas. HCN has a density of 0.687 $g/cm^3$, which is much less dense than water, and therefore HCN can be separated from water by density as well as by volatility. Other cyanide compounds are: cyanogen (NCCN), which becomes hydrogen cyanide (HCN) in water, and has a boiling point of −20.7° C.; cyanogen chloride (13.8° C.); and acetone cyanohydrin (82° C.). Note that all of these have lower boiling points than water (100° C.), i.e. they are volatile organic compounds. All cyanide species are considered to be acute hazardous materials and have therefore been designated as P-Class hazardous wastes. The remediation target for cyanide in wastewater is one microgram per liter (one part per billion), which is unattainable with presently known treatment technologies, even ultrafiltration, which at best can get to ten parts per billion.

Other noxious volatile organic compounds (VOCs) in municipal and industrial wastewater are benzene, toluene, and xylene; collectively, these are referred to as BTX. Like cyanide, BTX are much more volatile than water, have lower viscosity, and have lower density (approximately 0.87 g/cm$^3$ compared to water which is 1 g/cm$^3$). VOCs are very potent greenhouse gases and should be captured rather than vented to the atmosphere.

Dissolved dinitrogen gas ($N_2$) causes algae bloom and fish die-off downstream, as well as "blue baby" syndrome in humans. Nitrogen gas in municipal wastewater comes from microbial decomposition of waste and ammonia, and denitrification of wastewater is an important step in treatment. Dinitrogen gas extracted from wastewater may be harmlessly released into the atmosphere, but nitrous oxide ($N_2O$) is a very potent greenhouse gas, 296 times worse than carbon dioxide.

Odorants such as VOCs and ammonia and organic pollutants such as pharmaceuticals may be effectively extracted by cracking them into harmless compounds. An object of the present invention is to provide means for cracking water pollutants. An advantage of the present invention is that it may be applied to voluminous flows, such as municipal wastewater, to crack minute concentrations of pollutants, such as ammonia, hydrogen sulfide, and pharmaceuticals.

In any degassing process, it is recognized that agitation greatly aids gas evolution. The high turbulence (Re ~$10^6$) known to exist in von Karman swirling flow may provide excellent agitation for degassing. Providing means for application of von Karman swirling flow to degassing problems is another object of the present invention.

Cooling Water Treatment

Under-deposit corrosion in cooling water pipes causes localized pitting and expensive failure. Deposits can be from calcium carbonate or other scale, from silt, or from microbiological fouling. A consequence of pipe deposits is that they provide a home for colonies of metal-eating bacteria to thrive, and biofilm causes more deposits to stick inside of pipes. Even stainless steel can be damaged by voracious bacteria. Conventional cooling water treatment relies on chemical additives such as sulfuric acid, but these are becoming hard to obtain and prohibitively expensive. See D. Daniels, *Power*, v. 152, no. 9, pp. 74-78 (September 2008). A need exists for non-chemical means for cooling water treatment, and the present invention addresses that need.

Conventional Water Disinfection

By the term disinfection is meant the killing or inactivation of pathogens. Wastewater, or water supply, may contain pathogens such as *Giardia*, cryptosporidium, amoebas, bacteria, worms, snails, and viruses. The terms pathogens and microbes will be collectively used herein to refer to living contaminants of water, including viruses. Conventional chemical and filtration water disinfection is too complicated and expensive to be appropriate for use in field water purification for remote locations such as war zones or disaster sites.

Mixing of any chemical disinfectant into the water depends on turbulence. High turbulence (Re ~$10^6$) is known to exist in von Karman swirling flow. Providing means for application of von Karman swirling flow to means for mixing of disinfectants with water is another object of the present invention.

Some pathogens are in cysts, which are highly resistant to chemical treatment. The present invention provides an alternative to chemical disinfection. Chlorine, the most common conventional means for disinfection, is ineffective against cysts of cryptosporidium and *Giardia*. The futile overdosing of chlorine to treat cysts in swimming pools or in municipal water, in combination with the presence of methane in the water, produces disinfection byproducts (DBPs) including trichoromethane, commonly known as chloroform, a possible carcinogen and a regulated pollutant. The maximum allowable chloroform in wastewater is 80 parts per billion.

The present invention provides a scalable and simple high volume alternative to chemical disinfection.

Physical Water Disinfection

The recognized inadequacy of chemicals and membranes has led to increased interest in physical methods for disinfection, particularly ultraviolet light, cavitation, and pulsed electric fields. See S. B. Gupta, "Investigation of a Physical Disinfection Process Based on Pulsed Underwater Corona Discharges," (September 2007). In the Gupta study, pulsed electric fields caused corona discharges from a ceramic-coated anode lying along the axis of a cylindrical workspace. "Production of reactive oxidants like OH radicals and $H_2O_2$, combined with the appearance of UV radiation, shock waves, and strong electric field enhances the disinfection efficiency." Id. at 122.

Strong electric fields cause currents through conductive solutions, such as are contained in cells. Rupture of cell walls by current, or electroporesis, is well known. See N. I. Lebovka et al., "The kinetics of inactivation of spheroidal microbial cells by pulsed electric fields," arXiv: 0704.2750v1 [physics.bio-ph] (20 Apr. 2007).

An object of the present invention is to provide a simple and high-throughput reactor for physical water disinfection.

UV Radiation by Cavitation

Collapsing cavitation bubbles emit visible blue light. UV radiation is in the spectrum produced in water cavitation, including UVC (200-280 nm), UVB (280-315 nm) and UVA (315-400 nm). Pulses are superior to continuous UV light from a lamp because of the high peak power that can be achieved in a pulse. A near UV light source is much more effective.

A disadvantage of conventional ultraviolet water processing is that the UV light source is a steadily shining bulb, not a pulse, and light source is far from the target. Polluted water is highly conductive, and UV is high frequency, both characteristics which increase power dissipation between the source and the target. As the energy travels between the UV light source and the target microbe, most of it is absorbed in a few millimeters because of the small skin depth in such a conductive medium at such a high frequency. An object of the present invention is to provide means for locating a UV light source close to pathogens to solve the problem of power dissipation.

Cavitation

Cavitation is a well-known phenomenon which can chip boat propellers and spillways. Crackling may be heard when tiny cavitation bubbles collapse. Opinion is divided whether shock waves from the rebound after cavitation bubble collapse, or impinging microjets caused by collapse near solid boundaries, is principally responsible for the observed signs of fatigue. However, it is known that depth charges destroy submarines by an impinging jet from cavitation bubble collapse. On a micro scale, cavitation should have the same effect on *Giardia* and cryptosporidium cysts as depth charges have on submarines.

The local pressures and temperatures produced by cavitation bubble collapse can be literally astronomical. An example of the tremendous power of cavitation, on a micro scale, is Khatachatryan, et al., *Diamond and Related Materials* 17:931-936 (2008), who disclose an ultrasound reactor for diamond synthesis using impinging jets from cavitation bubble collapse to synthesize diamonds on suspended large graphite particles.

Both mechanical and electrical means can cause cavitation. Mechanical means include shear cavitation, jet cavitation, and acoustic cavitation. Electrohydraulic cavitation is produced by pulsed electric fields in a fluid.

Both shear cavitation and electrohydraulic cavitation are applied in the present invention. However, the combination of these two methods is not required, and either alone may be sufficient to produce disinfection, degassing, crystallization, suspended metal agglomeration, and other desired effects of cavitation.

Shear cavitation should be distinguished from acoustic and ultrasound induced cavitation. Although both cavitation mechanisms rely on transient pressure drops in the water to below its vapor pressure, shear cavitation is caused by shear, whereas acoustic cavitation is caused by vibration. Baldassare et al. U.S. Pat. No. 6,916,418 (2005) disclose a point of use water sterilization device which uses an ultrasonic transducer to nucleate and build cavitation bubbles. It should be noted that the same useful cavitation phenomena (shock waves, microjets, light, etc.) may result, whatever the cause of cavitation, and a shear cavitation reactor may also have indirect acoustic driving because of the shock waves from collapsing shear-induced cavitation bubbles.

Now that shear cavitation has been distinguished from acoustic cavitation, a further classification should be made. Shear cavitation may be produced by moving a surface through the water, such as is seen in the underwater wake of a bullet, or by jetting the water through an orifice. The latter method, which will be referred to herein as jet cavitation, is also called hydrodynamic cavitation in the art. It may be seen that in the former method, which herein will be referred to as shear cavitation, the momentum is principally in the solid surface and momentum transfer is into the fluid, whereas in the latter, jet cavitation, the momentum is in the fluid, and friction with the static surface of a flow restriction causes cavitation. It may be noted that acoustic cavitation in an inhomogeneous medium may be considered a species of jet cavitation because it is the acoustic wave pulsing fluid past more inert suspended particles (effectively the static solid surface in this case) that causes voids to form. But it may also be considered a species of shear cavitation because it is momentum transfer from the vibrating transducer (the moving solid surface) which causes the water to move. The purpose of the foregoing digression is to distinguish the present invention over prior art relating to jet cavitation and acoustic cavitation, and to minimize potential confusion which may arise from terminology.

Whatever causes the shear stress, the water tears at weak points in its structure, nucleating a cavitation bubble. Shear-induced voids quickly fill with evolved gases and water vapor, which enter the bubble through its surface. Weak points are where inhomogeneous constituents, such as particles or microbes, are present. Once the nucleated bubble reaches its maximum radius (typically less than 50 microns due to ambient water pressure restraining the expansion), the vapor condenses and the bubble suddenly loses volume in an implosive collapse. At the end of collapse comes a rebound and another shock wave as the bubble bounces from its compressive cycle and expands again. Near solid boundaries, such as cell walls, cavitation bubble collapse causes a penetrating microjet of water projected at the boundary.

In addition to shock waves and microjets, which rupture nearby cell walls, cavitation can also produce reactive species, such as OH (hydroxyl) radicals, which at an oxidation potential of 2.80 V are even more powerful oxidants than ozone (2.07 V). Cavitation produces light in wavelengths from 200-1000 nm, which includes ultraviolet light. The ultraviolet light from cavitation breaks down hydrogen peroxide ($H_2O_2$) into more OH radicals. See Gupta, supra. High turbulence from cavitation shock wave agitation helps to mix reactive species into the water for improved sterilization.

Crystallization may be assisted by cavitation. See for example Kozyuk et al., U.S. Pat. No. 7,041,144 (2006), which discloses a crystallizer using jet cavitation in combination with an added anti-solvent for producing small crystals of pharmaceuticals. An object of the present invention is to provide a shear cavitation reactor for continuous crystallization. For scale-forming compounds, such as calcium carbonate, the evolution of carbon dioxide into the cavitation bubble favors precipitation, and the agitation from cavitation collapse impels the nucleated crystals for secondary crystallization.

Nucleated crystals are accelerated by cavitation shock waves and gain momentum to become projectiles in the solution, further ripping the water and causing more cavitation. Some may become bullets which puncture cell walls. High momentum overcomes electrostatic repulsion between particles and allows them to agglomerate by inelastic collisions into clusters which may be easily filtered by suitable means downstream of the reactor.

Suspended metals as well are accelerated by cavitation shock waves, and become high density microbullets which rip through the water in the processing zone, causing more shear cavitation and also killing pathogens. Accelerated suspended metals may agglomerate by inelastic collisions into bigger and bigger projectiles.

Electrohydraulic Cavitation

Coupling electrical energy into water, to cause electrical currents, can cause vaporization and ionization in the current path, making a bubble. This is called electrohydraulic cavitation.

Allen U.S. Pat. No. 3,366,564 (1968) discloses an electrohydraulic batch sterilization process for killing microbes in vaccine. Wesley U.S. Pat. No. 4,458,153 (1984) discloses an electrohydraulic device for continuous water sterilization.

Coupling of electrical energy may be done by an arc discharge between oppositely charged electrodes or by a corona discharge from one electrode into the bulk liquid. A corona is a branched current originating at an electrode, comprising a multitude of streamers. Electric fields at propagating streamer tips can be extremely high (100 MV/cm), leading to rapid branching of the streamer into the bulk liquid as liquid molecules vaporize and ionize in the electric field and more plasma forms to extend the conductive path. Should corona streamers reach the opposite electrode, an arc discharge results.

Corona reactors prevent arcing conventionally by keeping the electrode charging time short, so after the corona forms it is quickly shut off by interrupting the power supply. For example, see S. B. Gupta, "Investigation of a Physical Disinfection Process Based on Pulsed Underwater Corona Discharges," (September 2007). Arcing, if allowed to dwell, may cause high power density on the electrodes, leading to erosion. The present invention provides an alternative to pulsatile power supplies for preventing arcing.

To avoid electrode erosion, the arc may be caused to move over the electrode surfaces so that power density does not build by arc dwelling. This is known as a gliding arc discharge. Gliding arc reactors use mechanical means, rather than the conventional electronic pulsing means connected to the power supply, to interrupt arc dwelling. The present invention provides means for applying gliding arc discharges in physical water treatment.

Advantages of Cavitation for Disinfection and Degassing

An advantage of using cavitation for disinfection is that cavitation occurs at weak spots in the structure of water, which happen to be where the microbes are, so the shock waves, microjets, and UV light pulses produced by cavitation will occur very near the targets and therefore will have a strong effect.

Life-sustaining gases within microbe vacuoles and outside cell walls can be stripped away by a point sink of low pressure nearby. Internal pressure will burst the pathogen when a nearby vacuum occurs. A powerful transient point sink can be provided by cavitation. In this way cavitation can destroy pathogens by sucking the gas out of them and by outward bursting of cell walls. Another object of the present invention is to provide means for placing a point sink near to microbes to suck away their life-sustaining noncondensable gases.

Cavitation alone can also produce OH radicals, which are powerful oxidants. See S. B. Gupta, "Investigation of a Physical Disinfection Process Based on Pulsed Underwater Corona Discharges," (September 2007) at p. 106. Additionally, cavitation, whether shear cavitation or electrohydraulic cavitation, deagglomerates bacteria flocs, ruptures cell membranes, reduces water turbidity, and enhances mixing of reactive chemical species. Id. at 119. Cavitation in combination with electric fields caused 3 log reduction of pathogens at a specific energy of 13 J/cm$^3$. A 6 log reduction required only 20 J/cm$^3$. Id. at 119.

The creation of bubbles in cavitation provides surfaces for dissolved gases to evolve, so cavitation should be an important feature of any degassing process. The difficulty in using cavitation for degassing is extracting the evolved gases immediately so they do not remix into the fluid. An object of the present invention is to provide simple means for immediately extracting evolved gases from cavitation bubbles, by means of organized sink flow in fractal turbulence.

Pulsed Electric Fields

By pulsing is meant the variation of a uniform polarity electric field across a control volume in a workspace. Pulsing may be by pulsed power supply into a static electrode facing that control volume, which is the conventional method. In Gupta, supra, a voltage of 30-50 kV was applied in pulses of 200-400 nanoseconds to the axial anode of a cylindrical reactor by an L-C chain, resulting in 10 mm long corona discharges from the anode into the water. Schrive et al., U.S. Pat. No. 7,381,328 (Jun. 3, 2008), discloses a pulsing (1 microsecond) mechanism comprising a DC power source, a switch, an inductor, and a capacitor in series with means 5 for subjecting a flow of effluents to a pulsed electric field [8:39-53]. The means for pulsing known to prior art are electronic means for pulsatile DC to electrodes, as in Gupta and in Shrive et al.

Gliding Arc Reactors

Alternatively, pulsing may occur when a discharge, whether an arc or a corona, sweeps through the control volume, as in a gliding arc (Glidarc) reactor. A gliding arc discharge connects electrodes but is not allowed to dwell at any spot so as to erode them. Moving the electrodes, or moving the fluid between them through which the arc propagates, causes the arc to move through the control volume, and therefore gliding arc discharge is another form of pulsed electric fields. An improved version of glidarc (Glidarc II) comprises one rotating cylindrical electrode nested with a coaxial static electrode, and axial feed flow between the electrodes. A. Czernichowski, et al., U.S. Pat. No. 6,924,608 (2005). Gliding arc reactors known to the art operate at high voltage with low alternating current.

The Glidarc II discussed above and the reactor disclosed by Hayashi, et al., U.S. Pat. No. 5,817,218 (1998) are examples of reactors where there is shear between the electrodes, using shear instead of pressurized gas flow to prevent erosion. Both show a single moving electrode. In the Glidarc II the rotating electrode is cylindrical. Hayashi shows a cold plasma reactor comprising a rotating disk electrode having a layer of catalyst and opposed to a catalyst-coated stationary plate electrode. Feed is peripheral to the turbulent gap between the electrodes. Alternating current at 30-50 kHz is applied to the Hayashi electrodes to create the plasma, although he says direct current may be used. A reactor for electrolysis comprising an axially fed workspace between co-rotating disk electrodes is disclosed by Fleischmann, et al. U.S. Pat. No. 4,125,439 (1978). Separation of electrolysis products in the Fleischmann, et al. device is by means of an annular splitter disposed between the electrodes.

A disadvantage of conventional gliding arc reactors using alternating current on the electrodes is the low current. $P=I^2R$, where P is power in watts, I is current in amperes, and R is the resistance of the fluid in ohms. Power, which is the rate of energy transfer into the fluid between the electrodes, depends on the square of the current, so small current means very small energy transfer rate. Another disadvantage of known gliding arc reactors is that residence time of feed in the processing zone between the electrodes is short because the feed must move rapidly in order to prevent erosion of the electrodes by transporting the arc.

A need exists for a reactor which has a high rate of energy transfer to the feed, a long residence time of feed between electrodes, minimal electrode erosion, minimal gas blanketing of the electrodes, and good separation of electrolysis products, and meeting that need is an object of the present invention.

Suspended Metals Extraction

Pulsed electric fields entail pulsed magnetic fields because every current creates a magnetic field around it. Pulsing magnetic fields repel conductive constituents, such as suspended metals and brine, by Lenz's law. This is inductive repulsion.

Conventional approaches to suspended metals extraction rely on chemical methods. Chemical methods are impractical for large flows, such as municipal water supply, due to the expense of reagents, the difficulty of mixing them thoroughly, and the difficulty of regenerating the reagents. Because the concentration of suspended metals is so small (on the order of parts per billion), and the volume of contaminated water to be treated is so enormous, chemical methods for extracting suspended metals are difficult to scale up from the laboratory economically. Adsorptive media, flocculants, and catalysts are overwhelmed by the large flows required. A need exists for non-chemical means for suspended metals extraction.

Arsenic (As) and mercury (Hg) are toxic metals which may be in very low but dangerous concentration in water. The US EPA limit for arsenic is 10 parts per billion, and the water supply of many millions of people exceeds that limit. Other metals of concern are iron (Fe), lead (Pb) and aluminum (Al). Valuable suspended metals, such as gold, are an unexploited resource.

Providing non-chemical means for oxidation and agglomeration of suspended metals, so they can be effectively filtered downstream by suitable means, is another object of the present invention.

Cooling Water Treatment

Chemical methods for preventing scale in heat exchange tubes and for killing the microorganisms which eat metals and cause biofouling are becoming prohibitively expensive. See D. Daniels, "Put a lid on rising chemical costs," POWER v. 152, no. 9, pp. 74-78 (September 2008). A need exists for an alternative to the conventional chemical means for cooling water treatment, and meeting that need is an object of the present invention.

Reverse Osmosis Feed Pretreatment

Before feed can be allowed to contact reverse osmosis membranes, it must be pretreated upstream. Precipitates, such as calcium carbonate, and biofouling may block the tiny pores of the membrane. A need exists for an alternative to the conventional chemical means for reverse osmosis feed pretreatment, and meeting that need is an object of the present invention.

Soil and Sludge Disinfection

Sludge from dirty water may be polluted by live microorganisms which are harmful to young plants. Amoebas and other pathogens in sludge may be harmful to humans which consume plants grown in such soil. A need exists for economical high-throughput muddy water disinfection, and the present invention addresses that need.

Field Water Purification

Field water purification, to make potable water out of a supply contaminated by amoebas, foul gases, and various pathogens, is conventionally practiced by reverse osmosis filtration following extensive chemical pretreatment. The energy required for reverse osmosis filtration is enormous, pre-treatment is expensive and complex, and the membranes eventually clog. In war zones, or disaster areas, the electric power and chemicals for conventional field water purification may not be available. Simple means for physical field water purification, not requiring chemical additives, membranes, high power, or filtration, is also an object of the present invention.

SUMMARY OF THE INVENTION

The following description is directed toward the application of the invention to solving problems of water purification. However, it will be apparent to anyone skilled in the art that this invention can also be used for the processing of other fluids, such as in food or beverage processing, as well as for chemical reactors, hydrocarbon mixtures, and combinations of pollutants, to produce improved reactions, separations, and cracking of the fluid components.

In the preferred embodiment for field water purification, axially fed counter-rotating disk-shaped centrifugal impellers shear water between them and thereby cause fractal turbulence in a radial shear layer. Dissolved gases evolve between the impellers from shear cavitation and from electrohydraulic cavitation due to pulsed electric fields. The evolved gases are axially extracted along the cores of radial vortices in the fractal turbulence of the shear layer. Evolved gases are sucked through the radial vortex cores into the impeller axis of rotation by an axial suction pump while the centrifugal impellers counter-rotate and advect feed radially outward in high shear. This is radial counterflow, von Karman swirling flow in an open system: water flows in continuously at the impeller axis, evolved gas flows continuously out at the impeller axis, and degassed and disinfected water is continuously atomized out at the periphery of the workspace. An advantage of the present invention is the long residence time of the feed in the turbulent processing zone as radial counterflow occurs.

Electrohydraulic cavitation is due to mechanically pulsed discharges between oppositely charged rugose annular electrodes on the counter-rotating impellers. The rugose surfaces in counter-rotation periodically reduce the distance between the electrodes and thereby cause audio frequency pulsed electric fields across the workspace.

The electrodes on the impellers are preferably charged by their counter-rotation through a common axial magnetic field, making each electrode a disk dynamo, or Faraday disk, with large opposite radial currents in each electrode. Thus the electrodes become shearing plates of a dynamic capacitor having large charges separated across the workspace. A high rate of energy transfer into the fluid is possible because of the high current between the plates. Erosion is prevented by moving the plates so as to separate the ends of incipient arcs.

Shearing the water and causing fractal turbulence comprising coherent low pressure sink flow conduits causes odorants and noncondensable gases to evolve and to be sucked quickly out of the water by the axial suction pump. The deodorized water atomizes at the periphery of the workspace, where the shearing impellers are closely separated. Atomizing creates large surface area for evolution of any residual odorants, and also causes evaporative cooling for downstream use of the effluent as cooling water.

Cavitation bubbles are stripped of evolved noncondensable gases, which are immediately sucked radially inward and out of the workspace, so they cannot remix following evolution. Therefore cavitation bubble collapse near the periphery of the workspace is not cushioned by the presence in the bubbles of noncondensable, and is very energetic for production of UV radiation, OH radicals, and lethal shock waves and microjets, all in close proximity to target pathogens.

In addition to the effect of shear cavitation, there may be an effect of pulsed electric fields where the counter-rotating impellers comprise oppositely charged electrodes. Shear between the electrodes prevents arc dwelling and power densities which may cause erosion, and also helps to mix OH radicals formed by cold plasma processes into the water for disinfection. Solutes such as suspended metals and ionic constituents in the feed are inductively repulsed from the periphery of the workspace by fluctuating magnetic fields between the electrodes, but pure water can flow through the periphery because it is nonconductive. So concentrated brine and suspended metals linger in the high turbulence of the workspace, the solution in the workspace becomes saturated, and crystallization and agglomeration occurs in the workspace as feed flows in continuously.

Shock waves from cavitation in the workspace impart momentum to the suspended metals and nucleated crystals, so they collide and cohere. Turbulence brings particles into contact, with momentum overcoming their electrostatic repulsion, and the suspended metals and crystallized salts agglomerate in chunks until the chunks gain sufficient momentum from the impellers to batter through the high turbulence and inductive repulsion and be ejected from the periphery. Thus agglomerated into chunks, the crystallized salts and the suspended metals, such as arsenic, mercury, iron, aluminum, and gold, become easy to filter by suitable means downstream of the shear reactor.

Even wide diameter centrifugal impellers can be driven by the peripheral drive wheels at nearly exact counter-rotation about the impeller axis. To add more torque for the rotation of the impellers, more peripheral drive wheels can be used, or one or more geared peripheral drive wheels engaging a circular rack gear or mitre gear teeth on the impellers. The peripheral drive wheels also serve to maintain close impeller separation despite their electrostatic attraction and the radial flow through the narrow space between the rugose annuli. The drive wheels could be bicycle or truck tires. Truck tires on a truck axle, driven by a truck motor, could drive the device. A pedaling human could drive a household-scale field water purification unit.

In an alternative embodiment, there is only one rotating centrifugal impeller and the opposing surface to it, defining the radial workspace, is stationary. This is still counter-rotation, under the preferred definition. As in the preferred embodiment, a radial shear layer, orthogonal to the impeller axis of rotation, comprises radial vortices in fractal turbulence sustained by the radial counterflow forcing regime of the centrifugal impeller and the axial suction pump.

SUMMARY DESCRIPTION OF THE DRAWING FIGURES

FIG. 1 connects to FIG. 2.

FIG. 3a shows a detail of one runner of the bottom impeller 4 intersecting one runner of the top impeller 5 in counter-rotation.

Figure 5:
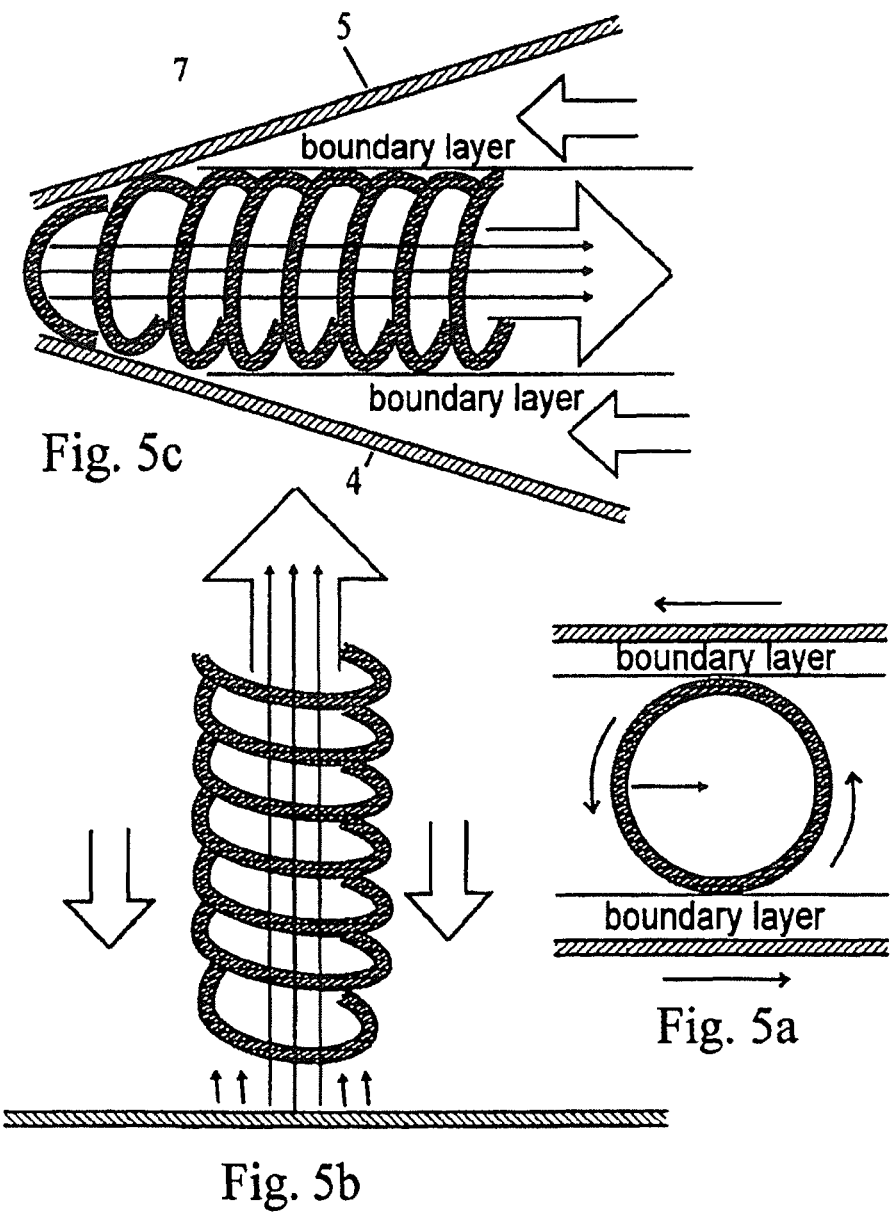

FIGS. 5a, 5b, and 5c explain the vortex-wall interaction.

Figure 6:
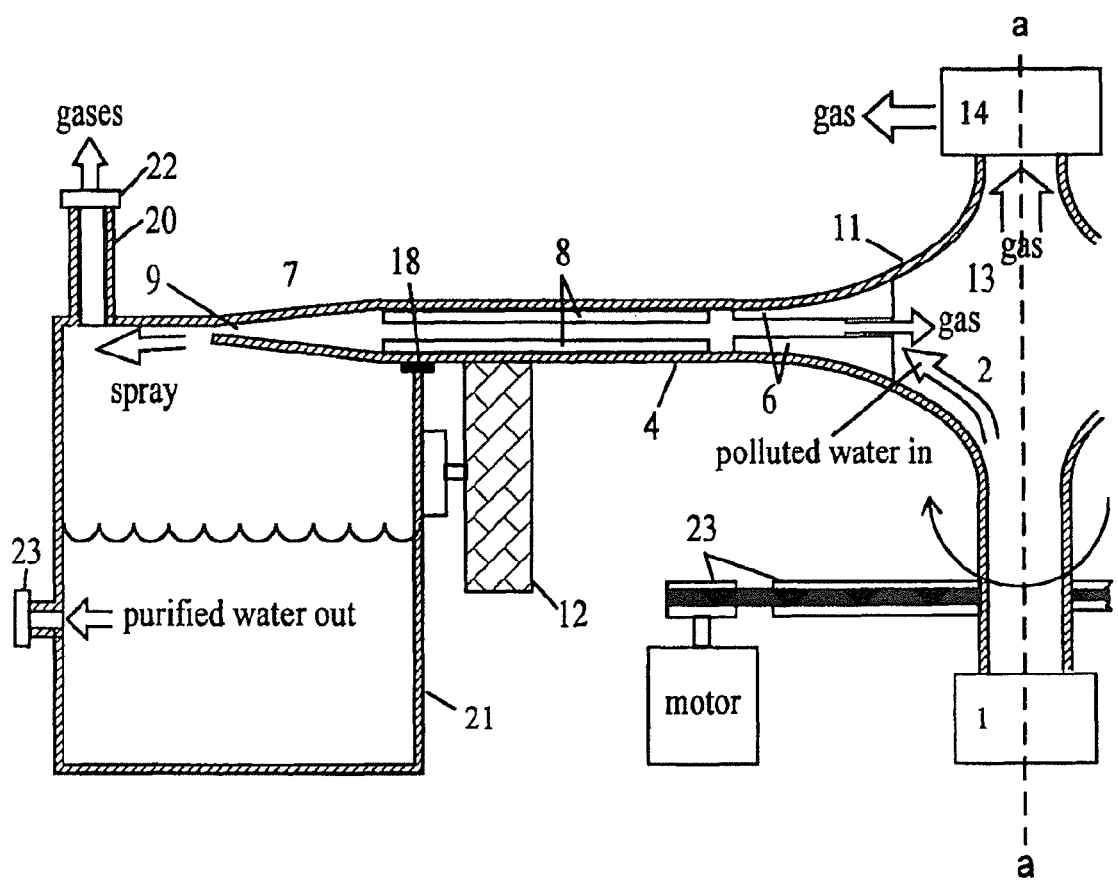

FIG. 6 shows a cross section of an alternative embodiment for field water purification by shear cavitation, wherein only one impeller is rotatable.

FIG. 7 shows an alternative embodiment for field water purification by pulsed electric fields.

FIG. 8 shows a detail of an alternative embodiment for the feed source 1.

Figure 9A:
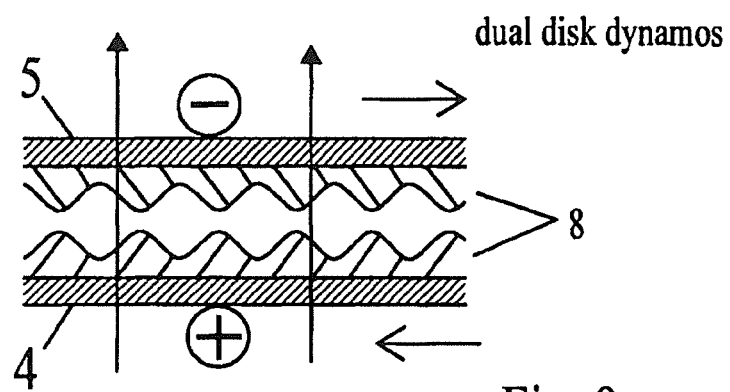

FIG. 9a shows alternative means for oppositely charging exactly counter-rotating rugose annuli by an axial magnetic field.

Figure 9B:
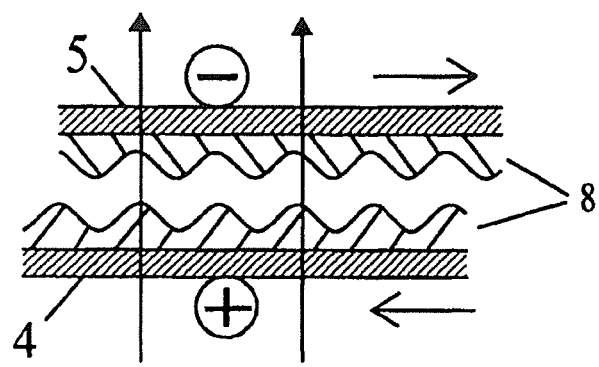

FIG. 9b shows alternative means for oppositely charging counter-rotating rugose annuli where only one impeller rotates.

Figure 10:
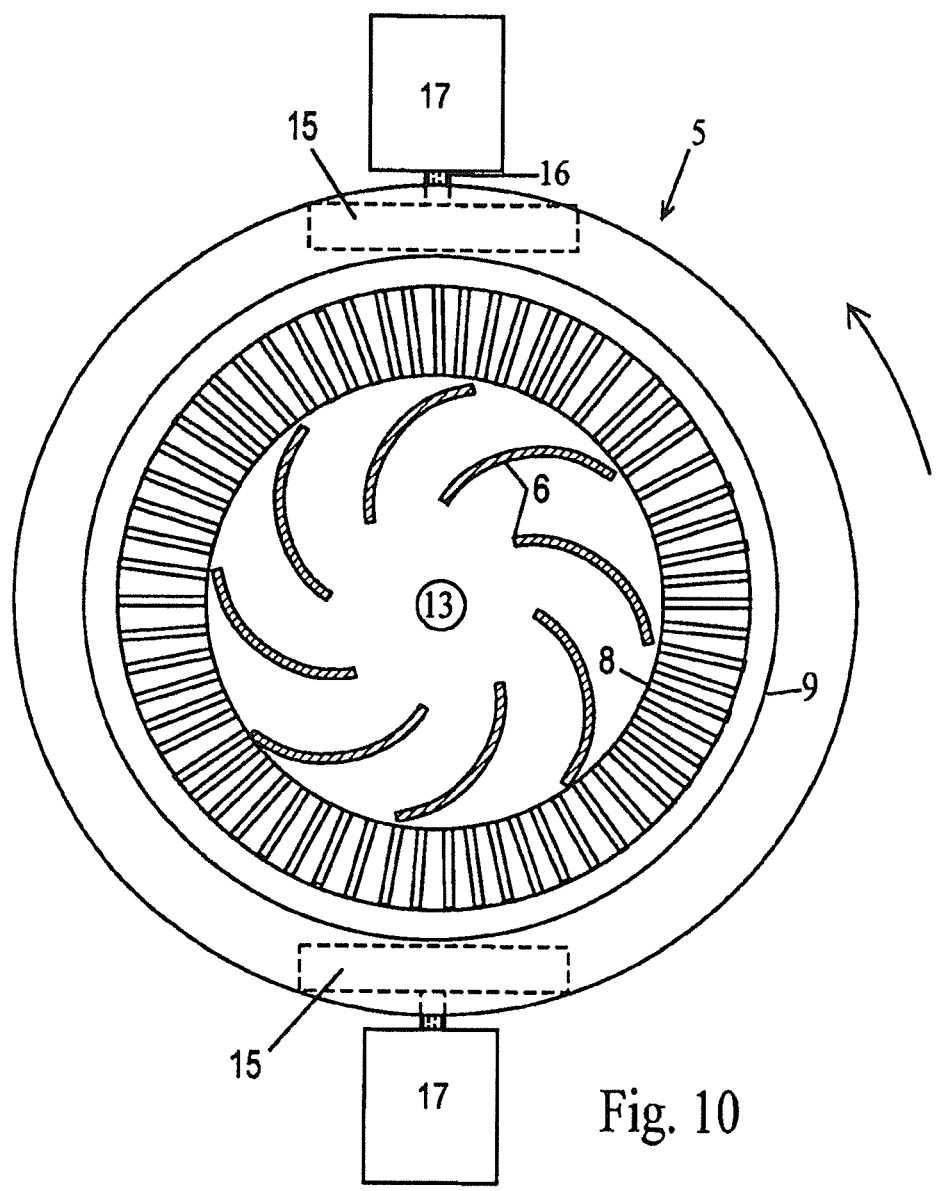

FIG. 10 shows a view of the top impeller 5 from the workspace.

Figure 11:
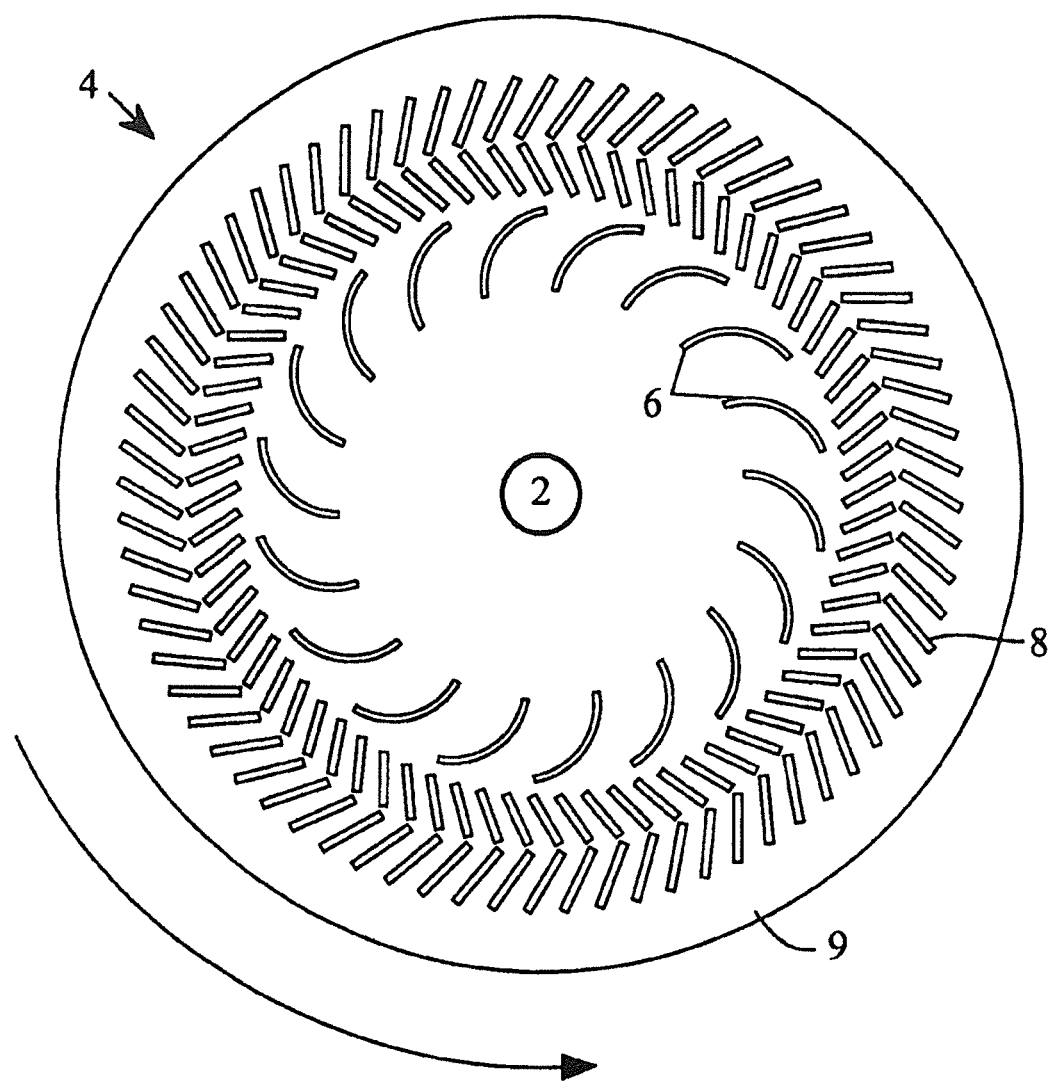

FIG. 11 shows an alternative embodiment of the bottom impeller 4, seen from the workspace. The rugose annulus comprises chevron-shaped radial ridges. The top impeller 5, seen from the workspace, is identical.

DRAWING REFERENCE NUMERALS

1—feed source
2—axial feed port
3—workspace
4—bottom impeller
5—top impeller
6—runner
7—pinch
8—rugose annulus
9—periphery, exit for purified water
10—electrode
11—casing
12—support wheel
13—axial exhaust port
14—axial suction pump
15—peripheral drive wheel
16—peripheral drive wheel spindle
17—peripheral drive wheel motor
18—slidable seal
19—impeller drive spindle
20—gas port
21—collection tank
22—check valve
23—capstan for belt drive
24—purified water outlet valve
25—battery for charging electrodes
26—slidable contact from battery terminal to rugose annulus
27—feed conduit
28—axial gas conduit

DETAILED DESCRIPTION OF THE INVENTION

The following description of the preferred embodiment and alternative embodiments is not intended to limit the scope of the claims, but only to illustrate the invention so that it may be readily understood by those of ordinary skill in the art as they apply it to their problem. What the different embodiments have in common is defined by the claims, and it is the claims, not the embodiments, which define the invention.

The description given here is directed toward the processing and purification of water, but the present invention can also be used for processing other fluids and fluid mixtures. Therefore, the description should be read as an example of use and not as a limitation.

Figure 1:
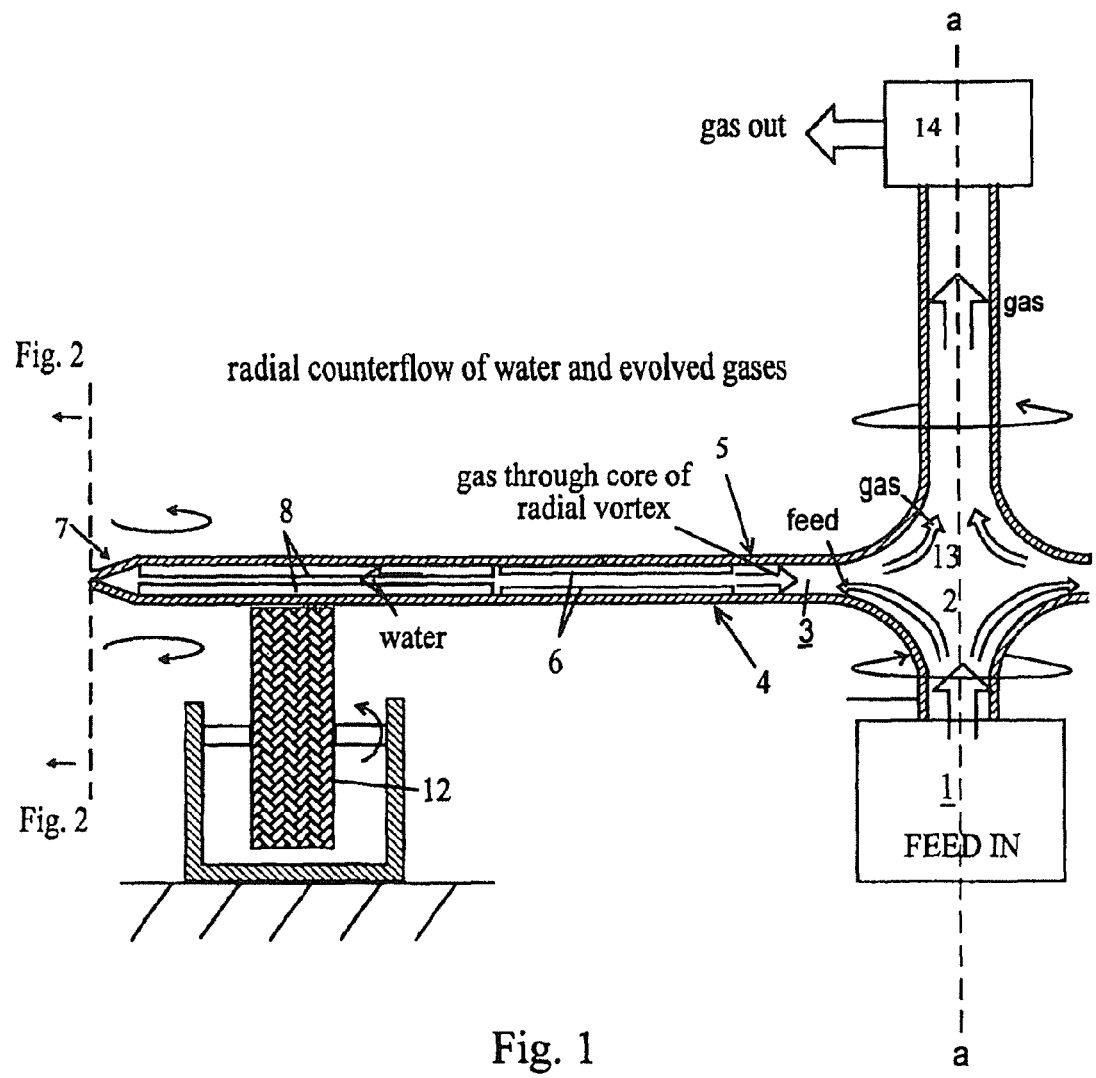
FIG. 1 shows a cross-sectional schematic view of part of the preferred embodiment for field water purification by shear cavitation, comprising counter-rotating centrifugal impellers.
Figure 2:
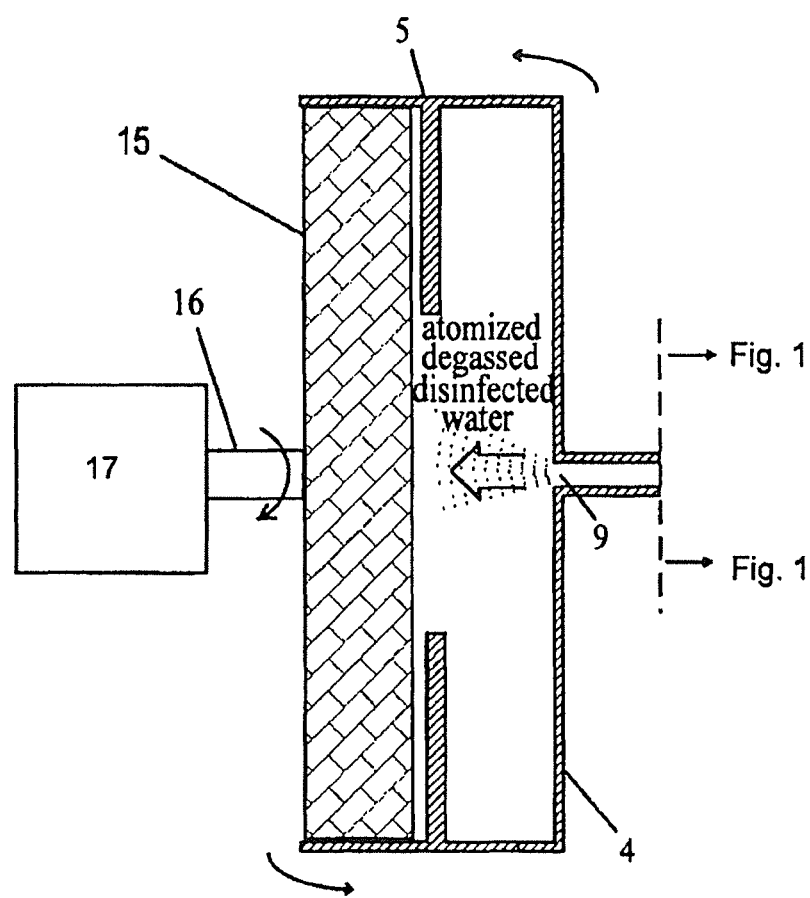
FIG. 2 shows a cross-sectional schematic view of the remainder of the preferred embodiment, showing a peripheral drive wheel for causing counter-rotation of the impellers.

FIG. 1 in combination with FIG. 2 shows the preferred embodiment of the present invention for use in field water purification. Presented is a schematic cross-sectional view. FIG. 2 connects to FIG. 1 as shown by the dashed lines. The device is symmetrical about the axis a-a, so the omitted portion to the right looks the same.

Referring now to FIG. 1, water from a feed source 1 flows through an axial feed port 2 into a radial workspace 3. The radial workspace 3 is defined by approximately parallel disk shaped opposing surfaces and provides a passage for water radially outward between the surfaces and out of the workspace at a periphery 9. At least one of the opposing surfaces is on a centrifugal impeller. Shown here are opposing surfaces on two coaxial counter-rotatable centrifugal impellers, a bottom impeller 4 and a top impeller 5. Each impeller is connected to means for rotation, and each operates as a centrifugal pump for fluid in the workspace. The axial feed port 2 is at the center of the bottom impeller 4. The impellers counter-rotate about the axis a-a thereby causing a radial shear layer in the workspace. Along the surfaces of the impellers are laminar boundary layers where feed and heavy fractions are advected radially outward by momentum transfer from the impellers. The shear layer comprises fractal turbulence between the laminar boundary layers and provides means for radially inward advection simultaneously with said radially outward advection in the boundary layers, which will be referred to as radial counterflow.

By the term counter-rotate is meant different angular velocities of the surfaces which define the radial workspace, about the axis a-a; exact counter-rotation is the case where the angular velocities are equal and opposite in direction, but counter-rotation also includes the case where one impeller rotates, and an opposed static surface does not. In accordance with this definition, the preferred embodiment shown in FIGS. 1 and 2 comprises exactly counter-rotating centrifugal impellers, although inexactly counter-rotating impellers are also possible. In the alternative embodiment shown in FIG. 6 there is only one centrifugal impeller, and the shear layer is between the rotating impeller and a static casing having a different angular velocity, namely zero.

Radially outward advection of water to discharge at the periphery 9 of the workspace is caused by momentum transfer from the centrifugal impellers 4,5 and may be assisted by feed pump pressure caused by suitable means (not shown). Each impeller acts as a centrifugal pump. In an alternative embodiment, shown in FIG. 6 and FIG. 7, there is only one rotating impeller, and the opposing surface which defines the workspace is part of a static casing. Exactly counter-rotating centrifugal impellers are preferred because for a given rotation speed the shear is greater than with an impeller and a static casing, and because the radial vortices in the shear layer are approximately straight conduits for passage of evolved gases, rather than curved conduits as in the alternative embodiment.

Figure 3:
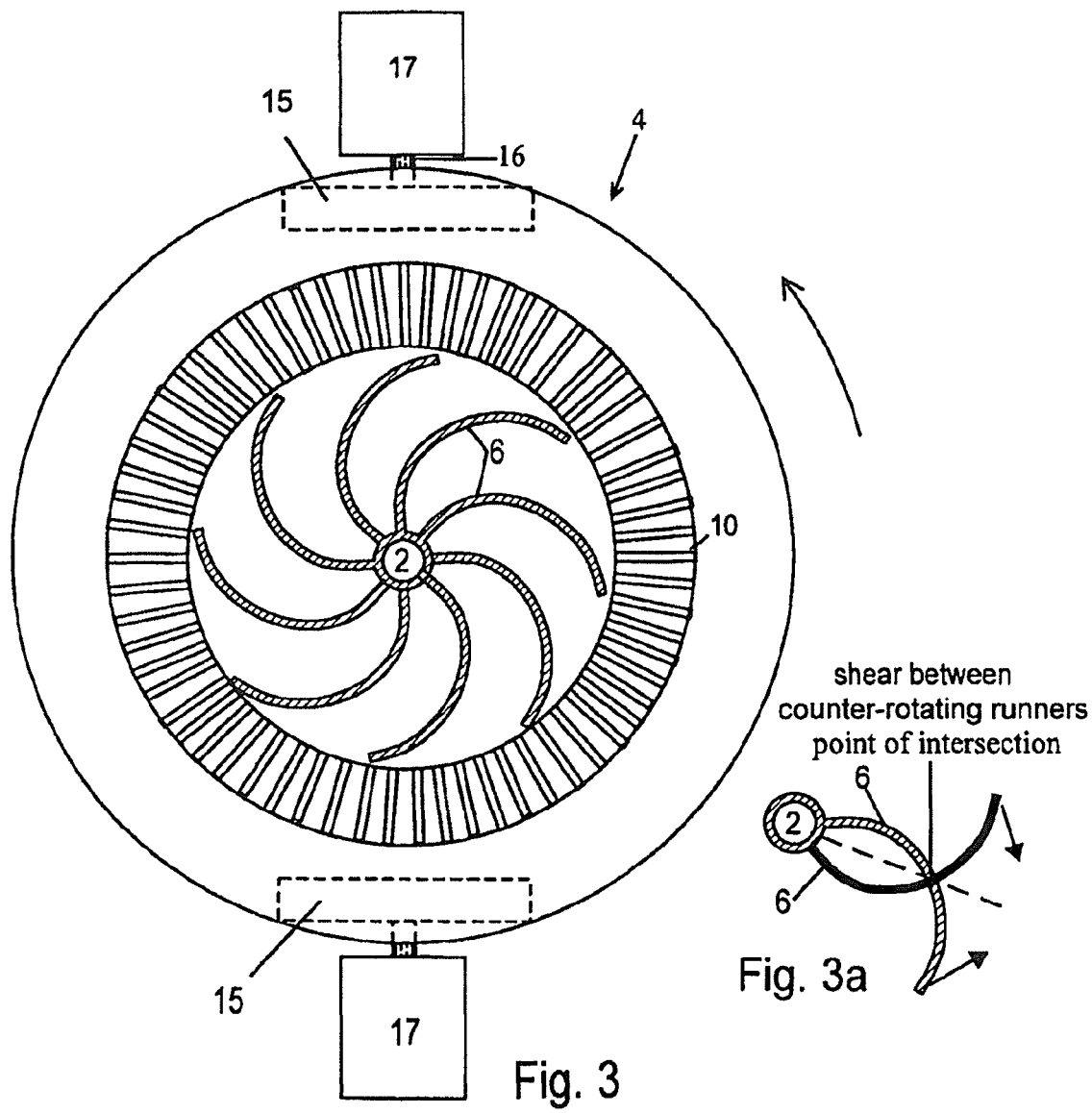
FIG. 3 shows a view of the bottom impeller 4 seen from the workspace.

Each impeller 4,5 preferably comprises a radial array of runners 6, as shown in FIG. 3. The runners on each impeller curve in an opposite sense. See FIG. 3*a*, where the runner of the top impeller is a solid line and the runner of the bottom impeller is the hatched line. Alternatively, all or part of one or both of the rotating surfaces defining the workspace may be rugose. By the term rugose is meant the opposite of smooth, and includes ridged surfaces, pitted surfaces, bumpy surfaces, and other non-smooth surfaces. Alternatively, all or part of the rotating surface could be smooth. Momentum transfer into the fluid within the workspace occurs due to contact between the feed and the rotating surfaces.

As the impellers counter-rotate, there is high shear, and therefore transient low pressure, at the points of intersection of their opposed and separated runners, as shown in FIG. 3*a*. The points of intersection move radially outward in a straight line, shown by the dashed line. The radially outward advection of the runners combines with the shear between them and the suction of the axial suction pump 14 to cause coherent radial vortices in the workspace, which act as sink flow conduits for evolved gases.

Shear between the runners creates the vapor pressure of water in the volume between the runners at that point of intersection. At that pressure, the water changes state from liquid to vapor. A cavitation bubble forms in the water and noncondensables and volatile compounds evolve at the bubble surface. The point of intersection moves radially outward continuously, so the cavitation bubbles are not spherical but helical, having a large surface area for evolution of gases, and the evolved gases within these bubbles can be extracted by providing a low pressure sink at the axis of rotation of the impellers, by means of an axial suction pump 14, which communicates with the helical bubbles through the axial exhaust port 13 in the top impeller 5.

When helical cavitation bubbles collapse, the low pressure path for mass flow is along the axis of the helix, which is the axis of radial vortices, so there is also a radially inward axial jet which pumps evolved gas toward the axis a-a and recirculates water for longer residence time. This is vortex pumping. The vortex-wall interaction (see FIGS. 5*a*, 5*b*, and 5*c*) of the radial vortices and the narrowing separation between the impellers causes axial jets to squirt radially inward through radial vortex cores, thereby recycling feed and increasing residence time of pathogens between the rugose annuli 8, where shear cavitation and pulsed electric fields can kill them.

Close separation at the points of intersection also creates strong electric fields when the runners are oppositely charged. The unit of measurement of electric field strength is V/cm, so it can be seen that decreasing the separation of the electrodes increases the electric field. Because the points of intersection move, discharges through the workspace at these points of intersection glide along the runners and do not dwell so as to cause electrode erosion. Opposite charges on the impellers cause electrolysis and the creation of OH radicals for oxidative processes such as disinfection of pathogens and agglomeration of suspended metals. Electrohydraulic cavitation caused by corona streamers causes shock waves, microjets, and gas evolution.

Electrolysis products are not allowed to linger at the electrodes, but are continuously swept away and axially extracted. Hydrogen from electrolysis is a low density fraction, having a molar mass of only 2 g/mol. The molar mass of the feed advected in laminar boundary layers along the electrodes, here water, is much higher, at 18 g/mol. Therefore hydrogen is immediately displaced from the cathode by the feed and is extracted along with other evolved gases through the radial vortices. Immediate axial extraction of hydrogen prevents recombination of electrolysis products in the reactor and thus increases the concentration of OH radicals in the turbulent workspace.

Methane, chlorine, nitrogen, ammonia, hydrogen, volatile organic compounds (VOCs), and other gases are stripped from the water through the radial vortices by the radially inward vortex pumping and radially inward advection is assisted by the work of the axial suction pump 14. The stripped gases discharged by the axial suction pump are recovered, vented, or otherwise treated by suitable means.

After a long residence time migrating outward in high turbulence between the impellers, degassed, demineralized, demetalled, disinfected and desalinated water atomizes in high shear as it exits the convergent periphery 9 of the workspace, thereby providing a large surface area for evaporative cooling and evolution of residual odorants. The atomized water is collected and separated by suitable means downstream, such as filtration or centrifugation, to remove agglomerated suspended metals, crystallized salts, and agglomerated biological matter.

Calcium carbonate ($CaCO_3$) is poorly soluble in pure water. Carbon dioxide ($CO_2$) in water drives calcium carbonate into solution to cause scale problems downstream. Degassing the dissolved carbon dioxide causes precipitation of scale-forming compounds in the reactor, before they can reach heat exchange surfaces, so they can be easily filtered out by suitable means. Scaling in cooling water pipes, which leads to corrosion and blockage, is thereby prevented.

Agitation and heating of the water also assists precipitation. The enthalpy increase due to cavitation and agitation causes inverse-solubility salts to come out of solution. Suitable means (not shown) for external heat flux into the impellers, so as to make them heating surfaces, would further assist crystallization of inverse solubility salts such as calcium carbonate and calcium sulfate, which are the scale-forming compounds. The high shear of the heating surfaces would provide forced convection in the workspace, to advect hot water away and prevent scaling on the heat exchange surfaces of the precipitating reactor.

In addition, the biocidal effect of cavitation and pulsed electric fields kills metal-eating bacteria and microorganisms which might cause biofouling. Thus the present invention provides an alternative to chemical treatment for protecting cooling water pipes.

Reverse osmosis membranes need to be protected from fouling by pre-treating the feed, and the present invention provides means for crystallizing scale-forming compounds and killing microbes in reverse osmosis feed physically, without resort to added chemicals.

The axial suction pump 14 could be a steam ejector, a positive displacement pump, or various pumps known to the art, comprising motor means (not shown). The axial suction pump creates a low pressure sink at the impeller axis of rotation a-a, and flow toward the axis a-a will be referred to as sink flow. Flow in the opposite direction, radially outward from the axis a-a, will be referred to as source flow. Simultaneous source-sink flow in the radial workspace 3 will be referred to as radial counterflow.

The feed passing from the axial feed port 2 into the workspace 3 is turned into a cyclone having its axis at the impeller axis a-a. At the cyclone axis, noncondensable gases and VOC vapors evolve at low pressure and go into the axial exhaust port 13, and into the axial suction pump 14. Liquid, which is much more dense, cannot follow the cyclonic gas flow and is advected radially outward from the axis a-a by the work of the centrifugal impellers 4,5. A combined liquid-gas flow is split into two streams: an axial stream of evolved gases, and a centrifugal radial stream of liquid. Alternatively, a baffle could separate the axial feed port 2 and the axial exhaust port 13 so as to prevent the direct flow of feed into the axial exhaust port. For degassing applications, the conduit connecting the axial exhaust port and the axial suction pump is long enough to prevent liquid intrusion.

As the feed flows radially outward through the workspace, high shear between the impellers 4,5 forms radial vortices in the shear layer like spokes in a wheel. The axial suction pump 14 creates a low pressure sink at the axis of rotation a-a of the impellers. The radial vortices connect to the low pressure sink at the axis a-a, and the radial vortices are themselves low pressure gradients connecting to finer scale vortices which are also low pressure gradients. A coherent low pressure path for radially inward extraction of evolved gases exists in the shear layer. Fine-scale vortices between the rugose annuli 8 connect to larger scale vortices radially inward toward the axis a-a in a cascade.

Noncondensable gases and volatile organic compound (VOC) vapors evolve in the fractal turbulence and are axially extracted from the workspace 3 by the work of the axial suction pump 14. Coherent radial vortex trees are sustained by radially inward vortex axis stretching due to the suction of the axial suction pump 14 and the simultaneous radially outward vortex axis stretching due to the shearing and outward pumping work of the counter-rotating centrifugal impellers 4,5.

Oils, suds, and low density liquids are other light fractions which may flow radially inward to the axis a-a, and they may be sucked out from the axial chamber through the axial pump or simply allowed to flow up the axial exhaust port 13 and through an aperture (not shown) in a conduit between the axial exhaust port and the axial suction pump.

Residence time of the feed in the turbulent treatment zone between the impellers can be as long as necessary for effective degassing, crystallization, and disinfection. If the mass flow through the axial feed port 2 is approximately the same as the mass flow through the periphery 9 plus the mass flow through the axial exhaust port 13, the volume of the workspace determines the residence time for feed in the workspace. The turbulent impedance to radially outward feed flow from the axial feed port 2 assures that every kilogram of feed will have a long and tortuous flow path through many other previously introduced molecules in a voluminous workspace before pure water from that kilogram of feed reaches the periphery 9.

For example, assume a flow out of the periphery at 1 kilogram per second and a feed rate of 1 kilogram per second through the axial feed port 2 (with mass of evolved gases out of the axial exhaust port 13 negligibly small for this rough calculation). In a 2 meter radius workspace, with impeller separation 5 centimeters, residence time of a kilogram of feed in the workspace is 628.3 seconds (200^2*π*5/1000=628.3). So even a slowly rotating device, operated by pedal power, would have sufficient residence time to kill amoebas or other pathogens by shear cavitation and to degas the water to remove hydrogen sulfide and noxious dissolved gases. Adjustment of the residence time should be obvious to those of ordinary skill in the art and readily discoverable by experimentation so as to achieve desired process flow and purity.

On startup, the impellers are brought up to speed before feed is introduced between them through the axial feed port 2, then suitable means, such as a feed pump, flood the workspace with feed through the axial feed port and drive out all gases out of the periphery. Once the workspace is full of liquid, and the shear layer develops between the impellers, the axial suction pump 14 begins to suck the evolved gases axially out of the workspace through the axial exhaust port 13.

A boundary layer exists against each impeller, wherein the feed flows in laminar fashion radially outward from the axis a-a, and a shear layer exists between the boundary layers, wherein flow is turbulent and gases evolve. See FIG. 5*a*. An array of radial vortex trees, which constitute a fractal network of connected low pressure gradients, extends through the shear layer between the counter-rotating impellers 4,5. The shear layer is orthogonal to the axis of rotation of the counter-rotating disk centrifugal impellers. Vortices of many scales, including fine scale eddy vortices, are connected into a tree due to the forcing regime of the counter-rotating impellers 4,5 and the axial suction pump 14.

The present invention discloses an open system, having continuous mass flow in, through the axial feed port 2, and out, simultaneously through the axial exhaust port 13 and through the periphery 9 of the workspace. As an open system, flow in the workspace is fundamentally different from closed system von Karman swirling flow in devices comprising counter-rotating disks forming end caps of a closed cylinder. Such closed system devices are used in studies of magnetohydrodynamics. Unlike the present invention, such closed system devices comprise no means for dissipating the energy which is input from the impellers because there is no mass flow through closed system devices.

The impellers 4,5 are counter-rotatable about a common axis of rotation a-a by suitable means. The means for counter-rotation may be various, including separate motors driving each impeller, belt drives off a common motor, or one or more drive wheels 15 as shown in FIG. 2 and FIG. 3. A human pedaling a bicycle, or a tire driven by an internal combustion engine, could provide the means for counter-rotation of the impellers. Alternatively, geared wheels could be used.

Prime movers for rotating the impellers (which are centrifugal pumps as well as armatures of disk dynamos) include wind power devices, internal combustion engines, steam turbines, and water power devices.

Preferably, a support wheel 12 bears some of the weight of the bottom impeller 4 as it rotates. The support wheel assembly could be provided with a motor and could provide drive means for the bottom impeller 4. Preferably, the impellers 4,5 are exactly counter-rotating so that the sink flow conduits for evolved gases are straight for maximally efficient gas extraction.

In the preferred embodiment, each impeller comprises a rugose annulus 8. The rugose annuli of the impellers oppose each other across the workspace, forming a high shear annular zone radially inward from the periphery 9. The rugose annuli of the impellers are preferred but might not be required for applications where only degassing is needed, such as process water deodorizing. Preferably the rugose annuli are connected to means for oppositely charging them as electrodes, as shown in FIG. 7 but this is not shown here in the interest of keeping features to a minimum in FIG. 1. Cavitation nucleation by electrical discharges between the rugose annuli would be a desirable feature for the apparatus shown in FIG. 1, because discharges nucleate vapor bubbles, and the shear between the radial ridges opens them into wide-radius bubbles having a large surface area in high pressure fluid and therefore high potential energy for powerful collapse.

The rugose annulus of each impeller preferably comprises an array of radial ridges. The ridges may as shown in FIG. 3, or alternatively may be slanted as shown in FIG. 11. As the impellers counter-rotate, their opposed rugose annuli shear the water in the workspace between them. Radial ridges periodically oppose through a control volume between the rugose annuli during counter-rotation.

Oppositely charged radial ridges in opposition are close together, therefore a strong transient electric field occurs between them, causing electrohydraulic cavitation. Arcs are extinguished as counter-rotation continues and the ridges anchoring the arc ends separate, so there is no electrode erosion.

In the case of axisymmetric ridges on the rugose annuli, as shown in FIG. 3, periodic opposition causes audio frequency high amplitude pressure cycles in the water by periodic shear cavitation. Each cycle goes from very low pressure (cavitation bubbles expanding due to shear) to very high pressure (cavitation bubbles imploding, causing shock waves on the rebound from implosion). An audio frequency high amplitude oscillation of pressure occurs next to microbes, which is where cavitation bubbles preferentially nucleate. Over a relatively small number of cycles, the energy in the bubble increases to the point that pathogens are killed by irradiation and by shock waves and impinging microjets. Also, the life-sustaining gases in and around the microbes are stripped violently into the expanding bubble.

In the case of slanted radial ridges, as shown in FIG. 11, a periodic pulse of low pressure through the control volume occurs due to gliding shear between the scissoring opposed ridges. Where the slanted radial ridges are on annular electrodes, discharges between the electrodes are gliding arc (Glidarc) discharges moving along the electrode surfaces too fast for arc dwelling and electrode erosion to occur.

Evolved noncondensable gases are continuously extracted through the low pressure gradients of the radial vortex trees in the shear layer of the radial workspace, as previously described, therefore cavitation bubbles become increasingly rich in water vapor as water flows radially outward into the portion of the workspace between the rugose annuli 8. When the cushion of noncondensables disappears, implosion of cavitation bubbles becomes sudden and energetic, generating powerful shock waves, microjets, and high energy photons in ultraviolet light.

The energy transfer by shear into cavitation bubbles is quicker than with an ultrasonic horn or other transducer because the amplitude of each pressure cycle is much greater. A shear pulse between the ridges can suddenly produce a strong transient low pressure, even the vapor pressure of water at that temperature. A pulse from an ultrasonic horn is much weaker. Much larger bubbles can be produced by shear cavitation, particularly where the bubbles are nucleated by electrical discharges at the same time as the water is sheared.

Because the water has been degassed upstream of the shearing rugose annuli 8, as previously described, and because the high shear between the rugose annuli rips the water apart for large cavitation bubbles, only a small number of implosion cycles are needed to achieve high energy densities very near to microbes. Due to the long residence time within the reactor, the barrage will be a long one, with few survivors.

Preferably, the rugose annuli comprise conductive material in their radial ridges and are oppositely charged across the workspace by suitable means while they are in counter-rotation, making them rippled electrodes. This is shown with more particularity in FIGS. 4c and 4d, FIG. 7, and FIGS. 9a and 9b. Means for oppositely charging the rugose annuli could include the means known from the prior art, or, preferably, their counter-rotation through a common axial magnetic field, which makes them disk dynamos, or Faraday disks, having opposite radial currents and therefore opposite charges across the workspace. Disk dynamos are known to generate very large radial currents. The currents are so large that they are used for arc welding and for railguns. The large opposite radial currents result in high opposite charges across the workspace. The voltage of the radial currents is small, but it is in the range of electrolysis redox reactions (±3 volts). Oppositely charging the counter-rotating rugose impellers, as shown in FIGS. 4*c* and 4*d*, and in FIGS. 9*a* and 9*b*, causes high amplitude pulsed electric fields for disinfection, crystallization, electrohydraulic cavitation, and electrolysis.

If only one annular electrode rotates through the axial magnetic field, and the opposed electrode does not and is at ground potential, there would still be a high electric field between the electrodes and high shear between them. An alternative embodiment comprising a radial workspace defined between one rotating centrifugal impeller and a static casing, with the electrode on the static casing at ground potential, and the electrode on the impeller rotating through an axial magnetic field, would be an example of this, and is covered by the claims of the present invention.

Instead of only annular electrodes, the whole impellers could be electrodes. For example, counter-rotating metal impellers connected to metal conduits at the axis of rotation, and a field coil around each metal conduit inducing current in the impeller as the conduit and its attached impeller rotates through the magnetic field of the coil, would be an alternative embodiment and is to be covered by the claims. Annular electrodes are preferred because their tangential velocity through the magnetic field is higher than the tangential velocity of the charged conduit embodiment, and because annular electrodes disposed in opposition near the periphery provide means for trapping conductive fractions, such as suspended metals, brine, and solutions, in the workspace while solvent can flow freely radially out through the periphery due to its nonconductivity.

The pulsed electric fields between the rugose annuli are accompanied by pulsed magnetic fields, and the pulsed magnetic fields repel conductive constituents from the rugose annuli and thereby exclude them from the periphery 9, according to Lenz's law. Induced currents in the conductive constituents, such as brine and suspended metals, cause magnetic fields of a polarity which causes the conductive constituents to be repelled from the inductor. This is inductive repulsion.

Suspended metals, such as arsenic, mercury, aluminum, iron, lead, and gold are among the conductive constituents in water. Suspended metals therefore concentrate in the workspace and agglomerate in the high turbulence there as they cohere in inelastic collisions.

Ionic constituents, which are also much more conductive than pure water, are rejected from radially outward flow and concentrate to saturation in the workspace. Eventually crystals of salt and clusters of agglomerated suspended metals reach a size and momentum sufficient to carry them through the periphery despite inductive repulsion, and they are propelled through the rugose annuli and exit the periphery in large enough chunks to be easily filtered by suitable means downstream.

To avoid erosion by cavitation and erosion by arcing, the surfaces of the rugose annuli may be covered by a layer of dielectric and resilient material, such as thermoset urethane. Separation of the rugose annuli is maintained by means of the peripheral drive wheels, and may be adjusted to prevent erosion of the rugose annuli.

The ultraviolet light produced by cavitation, and the oxidative species such as OH radicals produced by electric discharges in water and cavitation, are good for cyanide removal and for water disinfection. The production occurs in close proximity to the targets. High turbulence produces meandering electric discharges and good mixing of OH radicals into the feed.

Although the centrifugal impellers 4,5 advect fluid radially outward, the net radially outward flow velocity, particularly in the shear layer, is small due to the impedance of the pinch section 7 and the turbulence between the rugose annuli 8. Therefore there is long residence time for degassing. Water exiting the narrow periphery 9 is subjected to very high shear, from counter-rotation of the impellers, and high pressure, from the radially outward advection against turbulent impedance, therefore it atomizes. The mist produced by atomization of water has a large surface area, for evaporative cooling and for evolution of any residual odorants.

Electrolytic cracking of VOCs, ammonia, hydrogen sulfide, cyanide, and other compounds renders them harmless. The gaseous products of cracking are axially extracted continuously, preventing recombination.

Calcium carbonate precipitation occurs as carbon dioxide is stripped from the water. Added energy, from the shear and from the electric energy transfer, decreases solubility. The solution is trapped in the workspace by inductive repulsion while the solvent (pure water) is extracted through the periphery continuously, therefore saturation and crystallization occurs. Scale-forming compounds are thereby removed from cooling water and from reverse osmosis feed.

The device shown in FIG. 1 and FIG. 2 could be used for field purification of drinking water, powered by vehicle tires or human bicycle power. Noxious gases are axially extracted, pathogens are crushed, electrocuted, irradiated by a nearby UV light source, and dosed with highly oxidative OH radicals. Suspended metals such as arsenic are agglomerated into easily separable chunks, and dissolved solids are crystallized, in a simple device having long residence time.

For chemical reactors, including devices for precipitating dissolved solids, it has been observed that electrohydraulic cavitation produces sizable granules when the plasma bubble collapses. See Juvan, U.S. Pat. No. 4,957,606 (1990) [5:45-55]. The droplets in the atomized spray out of the periphery 9 would be cool, providing good conditions for secondary crystallization onto the crystals nucleated by electrohydraulic cavitation. Evaporation on the high surface area of the mist would cool the droplets and concentrate the dissolved solids. Electrohydraulic cavitation and atomization in a device according to the present invention could provide economical means for desalting water, including reverse osmosis reject brine, produced water from oil drilling, and seawater. Accordingly, in the preferred embodiment, suitable means known to the art are provided outside of the periphery for venting vapor while retaining brine, such as, for example, an annulus of fabric disposed beyond the periphery for collecting salt.

Evaporation in the present invention is caused by tearing the water apart to provide a large surface area for high velocity molecules in the Maxwellian speed distribution to escape. The conventional method, boiling, has the disadvantage that it works against crystallization for sodium chloride by raising the temperature.

For chemical reactors, a mixture of reagents introduced through the axial feed port 2 is mixed in the workspace, and low density products are axially extracted through the axial exhaust port 13. Low density products might include gases produced by chemical reactions, or low density liquids produced by chemical reactions, including low molecular weight hydrocarbons produced by cracking of long chain hydrocarbons. Solids exit the periphery 9. Cold plasma provides activation energy in a highly turbulent environment, with excellent separation of products and quick extraction of gases and light products from the processing zone and with long residence time of reagents. Vaporization of the electrodes by arcing can be prevented, or allowed in a controlled way so as to mix in metal atoms to the processing zone.

Cracking of ammonia, hydrogen sulfide, VOCs, and other gaseous pollutants to harmless products is another useful application of the cold plasma shear reactor disclosed by the present invention. For example, ammonia ($NH_3$) electrolyzed between the counter-rotating electrodes would dissociate and form (1) hydrogen gas ($H_2$), a low density product which would be axially extracted by means of the radial vortices and the axial suction pump, and (2) nitrogen gas ($N_2$), which would go out the periphery because its molar mass (28 g/mol) is significantly greater than that of hydrogen (2 g/mol) and that of the ammonia feed (17 g/mol).

In brine desalination, the conductive fractions (brine) are excluded from the periphery 9 by the Lenz's law repulsion due to the varying magnetic fields caused by pulsed electric fields between the rugose annuli 8. The solvent, fresh water, which is non-conductive, may pass through the rugose annuli, but salt remains in the workspace, concentrates to saturation, and crystallizes. Once the crystals reach a size sufficient that impeller momentum transfer can overcome the Lenz's law repulsion of the brine around them, they are ejected from the periphery in chunks large enough to be easily filtered downstream.

These other applications of the present invention, i.e. brine desalination, cracking, and chemical reactors, are also important, but in our view not as important as the critical shortage of potable water in developing countries. Therefore the discussion of the preferred embodiment has focused on field water purification, including degassing, demineralization, demetallization, and disinfection.

FIG. 2 shows a continuation of the preferred embodiment shown in FIG. 1, detailing the preferred means for causing counter-rotation of the impellers 4,5. A drive wheel 15 engages the top and bottom impellers. In addition, other non-drive sleeper wheels (not shown) can be added to maintain support and separation at other points around the perimeter of the impellers. The drive wheel is preferably synthetic rubber, such as a truck tire or a bicycle tire. A drive motor 17 turns a drive spindle 16 connected to the drive wheel 15. The impellers 4,5 in contact with the drive wheel 15 counter-rotate in opposite directions at approximately the same angular velocity. The drive motor 17 could be various devices, for example, an electric motor, internal combustion engine, or a pedal-powered device operated by a person. Atomized water exits the periphery 9 of the counter-rotating impellers 4,5. High shear between the rapidly counter-rotating and closely separated surfaces at the periphery tears the water into a fine spray. The surface area of water in this spray is very large, providing means for evaporative cooling of the water and for evolution of residual gases.

FIG. 3 shows a top view of the bottom impeller 4 and its radial array of runners 6. FIG. 10 shows a bottom view of the top impeller 5. A pair of drive wheels 15 and associated drive means is shown. Many more drive wheels than two could be used. In addition, other non-drive sleeper wheels (not shown) can be added to maintain support and separation at other points around the perimeter of the impellers. The drive wheels 15 engage the bottom impeller 4 such that rotation of the drive wheels causes the impeller to rotate in the direction shown by the curved arrow.

Figure 4:
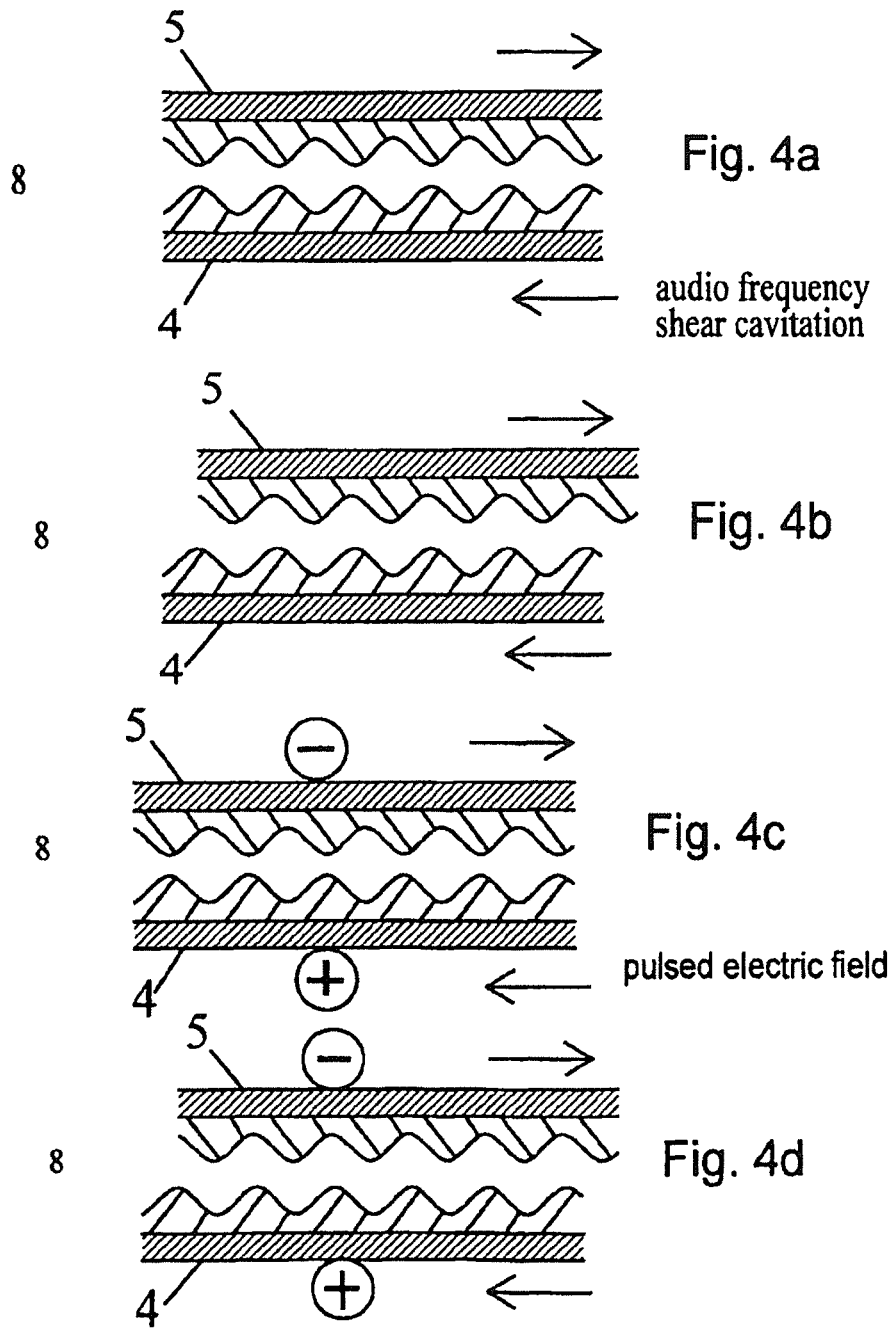
FIGS. 4a and 4b show a detail cross section of opposed rugose portions of impeller peripheral surfaces as the impellers counter-rotate.
FIGS. 4c and 4d show a detail cross section of opposed and oppositely charged rugose portions in counter-rotation, producing pulsed electric fields between them.

A rugose annulus 8 comprising axisymmetric radial ridges is shown. FIG. 11 shows an alternative embodiment of the radial ridges, which slant and scissor over each other at points of intersection which move radially outward or inward, depending on the direction of the slant, as the impellers counter-rotate. Both the top impeller and the bottom impeller comprise such an annulus, and the rugose annuli of the counter-rotating impellers are in opposition across the workspace. The radial ridges of the bottom impeller 4 periodically oppose the radial ridges of the top impeller 5 as the impellers counter-rotate. Periodic opposition causes periodic shear cavitation and, if the radial ridges are oppositely charged, as shown in FIGS. 4c and 4d and in FIGS. 9a and 9b, pulsed electric fields. The frequency is determined by the number of ridges in the annuli and by the rotation speeds of the impellers. Nucleated cavitation bubbles can be shear pulsed into very energetic collapse over a few cycles because the amplitude of each cycle is high. The pressure at the surface of the cavitation bubble is high, and the surface area is large, therefore the energy density upon collapse will be great.

A radial array of runners 6 on the bottom impeller 4 intersects a radial array of runners on the top impeller 5. A detail showing shear between counter-rotating runners is shown in FIG. 3a. The runner of the top impeller is the solid line, and the runner of the bottom impeller is the hatched line. Direction of rotation of each runner is shown by the arrows. The point of intersection moves radially outward, shown by the dashed line, as the impellers counter-rotate, enforcing a low pressure radial gradient providing a conduit for gases to be sucked radially inward. There are numerous points of intersection between the runners of the impellers. A peristaltic advection of water radially outward in swirl about the radial vortices occurs at the same time that evolved gases go radially inward through the cores of the radial vortices and are axially extracted through the axial exhaust port 13 by the axial exhaust pump 14. This simultaneous source-sink flow through the array of radial vortices is radial counterflow, as shown in FIG. 1. Fractal turbulence is caused by the radial counterflow forcing regime of the counter-rotating centrifugal impellers and the axial suction pump.

By the time the water, which enters from the axial feed port 2, has reached the workspace between the rugose annuli 8, it has been stripped of noncondensibles noncondensables and volatile compounds, so cavitation bubbles between the rugose annuli of the impellers are filled with condensible condensable water vapor without a cushion of noncondensibles, noncondensables, and therefore implode very energetically. Because cavitation takes place at weak points in the water structure, which happen to be where microbes are present, implosion at these nearby locations is excellent for killing pathogens by shock waves, microjet impingement, OH radicals, and radicals, and UV irradiation.

FIG. 4a and FIG. 4b show a detail of a rugose annulus of the impellers of the preferred embodiment. The view is from the impeller axis of rotation a-a and the impellers are shown in cross section. The rugose annuli comprise a rippled structure of radial ridges. The axisymmetric ridges shown in FIG. 3 are shown here in cross section. A rugose annulus of the bottom impeller 4 opposes a rugose annulus of the top impeller 5. Direction of impeller rotation is indicated by arrows.

The rippled surfaces of the rugose annuli on each impeller define peaks and valleys. The peaks are the radial ridges, which are portions of the surface which are close to the opposite impeller, and the valleys separate the radial ridges. When peaks oppose peaks, valleys oppose valleys, as shown in FIG. 4a. Continuing counter-rotation of the impellers, peaks oppose valleys, as shown in FIG. 4b. The cross-sectional surface area between the impellers remains the same during impeller counter-rotation but the equidistant separation of FIG. 4b becomes unequal separation in FIG. 4a. Where peaks oppose peaks, as in FIG. 4a, shear is high between them, which rips the water into large cavitation bubbles.

Continuing counter-rotation allows for the nucleated cavitation bubble to expand as the radial ridges move apart. The bubble reaches maximum expansion when valleys oppose valleys. So FIG. 4a shows a situation where bubbles are nucleating between peaks and culminating between valleys, two periodic bubble cycles out of phase. Still further counter-rotation begins to squeeze the bubbles which are between the valleys, initiating an implosion of the culminated bubble. High pressure between the rugose annuli, due to the centrifugal pumping action of the impellers and the confinement of the centrifugal flow by convergence of the impellers at the periphery 9, makes for very energetic bubble collapse, as all of that pressure over the bubble surface area is concentrated into a small point when the bubble implodes.

In FIG. 4b, where peaks oppose valleys and there is equidistant spacing between the rippled surfaces of the rugose annuli, the culminated cavitation bubbles are collapsing, and the nucleated cavitation bubbles are beginning to expand. Noncondensable gases which may evolve in these bubbles along with water vapor are sucked radially inward to the impeller axis (into the page) and away from the rugose annuli, through the fractal turbulence of the shear layer between the impellers. As water flows radially outward between the rugose annuli and periodic cavitation occurs by alternating opposition and separation of the radial ridges, the vapor content of the bubbles is enriched. Collapse of helical cavitation bubbles advects noncondensables radially inward (into the page) to axial extraction, in a milking action.

The pressure of the water in the workspace is high, due to the work of the counter-rotating centrifugal pumps and the confinement of radially outward flow by the pinch between the impellers. The surface area of the cavitation bubble is transiently large due to high shear. Therefore collapse will be very energetic because the high pressure over a large area is concentrated to a small volume.

Cavitation preferentially occurs where there are structural weaknesses in the water, and these weaknesses exist where there are suspended solids, including microbes. During the expansion phase of the cavitation bubble, sustaining noncondensable gases in and near the microbes are sucked away into the bubble, which is a powerful local low pressure sink next to the microbe. The noncondensables then join the sink flow through the fractal turbulence, as discussed above, and are axially extracted. The cavitation cycle removes life sustaining gases in and around pathogens, including their gaseous means for buoyancy in the fluid. Sudden collapse, or implosion, compresses very strongly, and produces high energy photons in ultraviolet light. A shock wave from the rebound of this implosion crushes nearby microbes and other pathogens. Numerous ripples on the impellers and high rotation speed cause audio frequency high-low pressure cycles and resonant cavitation as bubbles expand and implode at the same place.

For example, rugose annuli comprising 100 radial ridges, and rotating at 3 revolutions per second, in opposite directions, would produce periodic shear cavitation at 600 Hz. A residence time of only 30 seconds between the rugose annuli would subject pathogens to 18,000 pressure cycles. Much longer residence times are possible with a reactor according to the present invention.

FIGS. 4*c* and 4*d* show an alternative embodiment, comprising oppositely charged electrodes in the rugose annuli. For water disinfection, oppositely charged rugose annuli are preferred. Also, for degassing applications not involving flammable gases, oppositely charged electrodes would help to nucleate cavitation.

Periodic opposition of oppositely charged ridges causes lethal pulsed electric fields through the water between the rugose annuli. The close proximity of the opposite electrodes is maintained by means of the peripheral drive wheels, which hold the electrodes apart despite their electrostatic attraction. Discharges are not erosive because any arc ends are quickly separated by electrode counter-rotation.

Pathogens are more conductive than pure water, due to their ionic content, so the electric fields will cause current flow preferentially through pathogens, electroporesis puncturing cell walls. Pulsed electric fields are known to be effective in killing pathogens, and the present invention provides means for pulsed electric fields which are transiently very high due to transiently close electrode separation and very large charges on the opposing ridges due to counter-rotation of the conductive rugose annuli through a common axial magnetic field.

Means for oppositely charging the rugose annuli include slidable contacts, as shown in FIG. 7, or by counter-rotation of the rugose annuli through a transverse axial magnetic field. This is discussed under FIG. 9*a* and FIG. 9*b*.

FIGS. 5*a*, 5*b*, and 5*c* illustrate the vortex-wall interaction. See also V. Shtern, et al., "Collapse, Symmetry Breaking, and Hysteresis in Swirling Flows," Ann. Rev. Fluid Mech. 1999, 31:537-66, particularly FIG. 1 on p. 540. When the end of a vortex encounters an impedance to its rotation, such as a tornado touching down, the result is a strong axial jet along the vortex core in a direction away from the impedance. Rotation slowed by drag at the vortex end causes a radially inward squeeze. Another example of this phenomenon is the Ranque-Hilsch vortex tube.

In the vortex-wall interaction occurs as the radial vortices in the shear layer between the impellers encounter the space between the rugose annuli 8, where the cross-sectional area of the workspace is reduced, and also when they encounter the pinch 7 of the workspace after the rugose annuli leading to the periphery 9, where the impellers converge to closer separation. The vortex-wall interaction pumps fluid radially inward and thereby increases residence time. Radially inward advection assists axial extraction of noncondensables by the axial suction pump 14. The vortex-wall interaction at the pinch 7 is a continuous effect, but because the separation in the region of the rugose annulus is changing because of the periodic opposition of the ridges, the vortex-wall interaction there will also be periodic, resulting in a pulsing advection force milking noncondensibles and recycling feed toward the axis a-a.

In FIG. 5*a*, a centripetal force is shown. When the vortex tip encounters an impedance, the friction opposes tangential velocity of fluid and thereby contributes to the centripetal force and drives an axial jet of fluid up the vortex core, as shown in FIG. 5*b*. If, instead of a wall, the vortex encounters a pinch 7, as shown in FIG. 5*c*, an axial jet also occurs. This rebound jet from a vortex encountering an impedance creates a back pressure from the impeller periphery, which assists sink flow and advects water back to toward the axis a-a.

FIG. 6 shows an alternative embodiment for field water purification by shear cavitation in which only the bottom impeller 4 rotates, turned by a motor and belt drive comprising a capstan 23 connected to the bottom impeller and a capstan connected to the motor, and a belt connecting the capstans. No means for oppositely charging the rugose annuli 8 to make them electrodes are shown, but might preferably be added.

This alternative embodiment is meant to illustrate with maximal simplicity the use of the present invention in field water purification where motors are available, and to illustrate how the present invention may be implemented using only one rotating element and without charging means. The bottom impeller comprises runners 6 which serve to advect water from a source 1 through the axial feed port 2 and radially outward through the radial workspace 3 from the axis of rotation a-a as the bottom impeller is turned by the motor and belt drive. A static casing 11 serves to define the radial workspace 3 in opposition to the bottom impeller. Both the rotating bottom impeller 4 and the static casing 11 opposite to it comprise rugose annuli 8 which are opposed to each other across the workspace 3. The alternating opposition and separation of the radial ridges of the opposed rugose annuli, due to impeller rotation, causes periodic shear cavitation for killing pathogens.

The separation between the impeller and the casing narrows at the periphery 9 such that water exiting the workspace is atomized into a spray. A tank 21 collects the atomized water. A gas vent 20 comprising a check valve 21 provides means for evolved noncondensables and residual odorants to exit the tank. For desalination applications, the gas vent would communicate with a low pressure sink, such as a condenser, and the mist would drip down a baffle into the tank where secondary crystallization would take place.

The impeller engages the tank at a slidable seal 18 in order that that tank pressure can condense water vapor in the tank. A support wheel 12 bears the weight of the impeller 4 in order that the slidable seal 18 need not be load-bearing. Gases evolved in the workspace are axially extracted through the axial exhaust port 13 through the axial suction pump 14 as the impeller rotates and shears the water it centrifugally pumps against the opposing wall of the casing.

FIG. 7 shows another alternative embodiment, illustrating field water purification by pulsed electric fields and showing a bottom impeller turned by a motor and drive spindle. This could also be for cavitation purification as well. Or the rugose annuli of FIG. 6 could comprise oppositely charged electrodes for pulsed electric field purification as well as cavitation purification, which would be the best of all. Separate alternative embodiments for field water purification are meant to illustrate the different features and alternative means for rotation and feed and axial extraction of gases.

Rugose annuli 8 of a rotating bottom impeller 4 and a static casing 11 are oppositely charged by a battery 25 or other current source. A slidable contact 26 connects the electrode of the impeller to the battery, making the rugose annulus of the impeller an anode. The casing connects to the other terminal of the battery and is at ground potential. The alternating opposition and separation of the radial ridges of the oppositely charged rugose annuli of the impeller and of the casing causes pulsed electric fields in water flowing outward from the axis a-a. The amplitude of the pulses is high because the electrode separation, which is the distance between the radial ridges, is transiently small, creating a transiently high electric field between the ridges. Even though the electric fields are very strong, there is no electrode erosion by arcing because the ridges are only close for a very brief time, and the fields are audio frequency. Pulsed electric fields electrocute pathogens in a powerful turbulent corona and cause electrohydraulic cavitation.

Metals, such as arsenic, which may be present in the feed are excluded from the periphery 9 and therefore from the tank 21 by Lenz's law. Pulsed electric fields entail pulsed magnetic fields, which induce currents in conductive constituents such as metals in the water, repelling them from the source of the varying magnetic fields, which is the periphery of the workspace. The solvent, fresh water, is nonconductive, so it can pass through, leaving behind the excluded metals, which concentrate and agglomerate in the turbulent workspace until reaching a density where they have sufficient mass and momentum to overcome the repulsion at the periphery. Spun out from the shear layer into the boundary layer, their momentum increases in radially outward flow there due to momentum transfer from the impellers. Agglomerated metals are too dense to persist in the shear layer, and are spun out of radial vortices to contact the impellers and get a momentum boost. At that point, the concentrated metal particles are ejected from the periphery where they can be collected by suitable means. Agglomerated metals bouncing through the feed in the workspace upstream of the periphery would accrete smaller particles in a snowball effect.

Alternative means for oppositely charging the rugose annuli in counter-rotation are shown in FIGS. 9a and 9b. The rugose annuli counter-rotate through an axial magnetic field, and thereby become disk dynamos forming the plates of a dynamic capacitor for coupling energy into the water between the rugose annuli.

FIG. 8 shows a detail of the feed source shown in FIG. 7. Water feed enters the feed source chamber 1 through a feed conduit 27 and swirls into an opening between the casing 11 and the axial gas conduit 28, as shown by the flow arrows. This is an alternative embodiment for axial extraction of noncondensables. The vortex-wall interaction axial jets and the collapse of helical cavitation bubbles serve to advect gases radially inward. An axial gas conduit 28 without an axial suction pump might suffice for axial extraction of gases against atmospheric pressure. For extraction of vapors, an axial pump 14 connecting to the gas conduit 28 would be preferable because strong low pressure gradients in the workspace are preferable for evolution and capture of volatile vapors is preferable for pollution prevention. This alternative embodiment provides means for heat exchange between the extracted gases and the feed.

FIG. 9a and FIG. 9b illustrate alternative means for oppositely charging counter-rotating rugose annuli, by rotating them through an axial magnetic field shown by the vertical arrows so as to make each rotating rugose annulus a disk dynamo (Faraday disk) and thereby create oppositely charged counter-rotating electrodes across the workspace. Disk dynamos create a large current and a small voltage (<3 volts) between their periphery and their center. The large current means that there will be opposite large charges separated across the workspace between the rugose annuli. As the radial ridges come close, as shown in FIG. 9a, a transiently high electric field occurs between the electrodes. Water between the rugose annuli breaks down and ionizes in plasma bubbles due to electrohydraulic cavitation. Cavitation improves degassing and also produces shock waves and OH radicals which kill pathogens.

Alternatively, only one rugose annulus might rotate through an axial magnetic field, and the other remain stationary, at ground potential. There would still be a potential difference between the rugose annuli, but not as much as if both were rotating in opposite directions through the axial magnetic field.

The axial magnetic field could be from a permanent magnet or from one or more electromagnets having opposite poles straddling the counter-rotating rugose annuli. Disk dynamos, commonly used for welding and high current applications such as rail guns, are known to generate very high radial currents at low voltage between the disk periphery and center. The opposite radial current flow in the rugose annuli would create high charge separation across the workspace for pulsed transient high electric fields across the gap between the rugose annuli as the ridges come close together and then quickly separate.

Discharges from the oppositely charged electrodes nucleate cavitation, electrolyze water, crack VOCs and ammonia, and produce OH radicals and shock waves from expanding cavitation bubbles. When the radial ridges move apart, as shown in FIG. 9b, the arcs extinguish and the cavitation bubbles are squeezed by ambient pressure reinforced by transient pressure increase from the converging ridges, so the bubbles energetically implode and emit ultraviolet radiation and, perhaps, nuclear emissions.

FIG. 10 shows a view of the top impeller 5 shown in FIG. 1, looking from the workspace into the axial exhaust port 13. Direction of rotation is shown by the arrow. Note that both the top impeller and the bottom impeller, when viewed from the workspace, have the same direction of rotation and the same sense of curvature of their runners. The runners of the top impeller are shorter than those of the bottom impeller so as to avoid disruption of the radial vortices going into the axial exhaust port 13. A radial array of spiral runners 6 precedes a rugose annulus 8, which precedes the periphery 9 as water flows radially outward from the axial feed port 2 in the bottom impeller 4 (not shown). The runners 6 and the rugose annuli 8 shear the water during its radially outward flow. As noted previously, a point of intersection between a bottom impeller runner and a top impeller runner will move radially outward as the impellers counter-rotate.

FIG. 11 shows a view of the bottom impeller 4 in an alternative embodiment. The view is from the workspace, looking into the feed port 2. Direction of rotation is shown by the arrow. The rugose annulus 8 in this alternative embodiment comprises chevron-shaped radial ridges. Like the runners 6, the radial ridges of the rugose annulus shear the water like scissors and cause transient low pressure gradients and high electric fields at their points of intersection. The portions of the chevrons which are closest to the runners are slanted in the same direction as the runners. The remaining portions of the chevrons, radially outward beyond the point of the v, slant opposite. The oppositely slanting chevron portions squeeze water radially inward toward the v point of the chevrons, enhancing ambient pressure for collapsing the cavitation bubbles in that region and increasing residence time of water in the treatment zone. The top impeller looks the same, viewed from the workspace, in the alternative embodiment.

Electrical discharges glide along the points of intersection of the opposed radial ridges of the rugose annuli of the top and bottom impellers. Arcs do not dwell, and therefore power density does not become sufficient to erode the electrodes. Electric energy is coupled into the water by means of the gliding arc discharges. OH radicals produced by the arcs kill pathogens, and the strong electric fields electrocute them and produce electrohydraulic cavitation which crushes them with a barrage of powerful shock waves and impinging microjets, and nearby ultraviolet radiation.

FURTHER REMARKS

Simultaneous source-sink flow, or radial counterflow, through the radial workspace 3 between the counter-rotating centrifugal impellers is organized and maintained by the forcing regime of the impellers 4,5 and the axial suction pump 14. Source flow is radially outward in laminar boundary layers against the surfaces defining the radial workspace 3. Sink flow is radially inward due to the axial suction pump and the vortex-wall interaction. A shear layer is formed between the laminar boundary layers by the radial counterflow forcing regime.

Opposed radial forces put the water in tension and thereby create its vapor pressure. The resulting bubbles are organized in fractal turbulence in the shear layer. Gases evolve into the bubble network of the shear layer. The radial vortices in the shear layer communicate with the axial suction pump and provide sink flow conduits for the continuous axial extraction of evolved noncondensable gases and of vapors.

A radial impedance, such as the pinch 7 narrowing the separation of the impellers to the periphery 9 acting as a convergent radial nozzle, slows centrifugal flow and provides long residence time for fluid in the workspace between the impellers. The narrowing also causes back pressure by means of the vortex-wall interaction, as explained in the discussion of FIGS. 5*a*-*c*. The advantage of long residence time is that the water purification by shear cavitation, pulsed electric fields, and degassing can have sufficient time to be effective. Although the centrifugal impellers powerfully advect fluid radially outward through the radial workspace, confinement by the radial impedance keeps the radially outward flow velocity low so that feed lingers between the shearing centrifugal impellers. It also builds up pressure so that water exiting the periphery 9 is atomized and cavitation bubbles in the processor collapse energetically.

Shear atomization sprays water from the periphery 9. The atomized water has a large surface area for degassing and evaporative cooling. Purified and degassed water collects in a tank 21 radially beyond the periphery, as shown in FIGS. 6 and 7. The tank might also be part of the preferred embodiment shown in FIGS. 1 and 2.

The radial impedance also causes a radially inward force, due to the vortex-wall interaction, as explained in the discussion of FIGS. 5*a*-*c*. This back pressure drives light fractions such as oils, suds, and gases through the radial vortex cores back to the impeller axis of rotation. The axial suction pump 14 also assists sink flow of light fractions and maintains coherence of the radial vortices by stretching the vortex axes.

The rugose annuli 8 could comprise protuberant features of many different shapes. Shown in FIGS. 4*a*-4*b* are counter-rotating corrugated impeller surfaces. Opposed corrugated surfaces of a static casing and a rotating impeller are shown in FIGS. 6 and 7. Yet another could be hemispherical bumps. And yet another could be waffle grid indentations. The impellers and their electrodes could even be smooth. The rugose annuli serve to advect feed radially outward and to shear the feed so as to evolve gases and to cause periodic shear cavitation. The frequency of opposition of the protruding features on the rugose annuli, such as the radial ridges shown in FIGS. 4*a* and 4*b*, is determined by their number and the impeller rotation speed. This frequency will preferably be in the audio range (<20 kHz).

Alternative means for oppositely charging the rugose annuli during counter-rotation are shown in FIG. 7 and in FIGS. 9*a* and 9*b*. Oppositely charging the rugose annuli is preferred for cavitation nucleation and for disinfection by pulsed electric fields. The counter-rotating impellers having oppositely charged rugose annuli nucleate cavitation bubbles and expand them rapidly, then collapse them suddenly. An advantage of the present invention is that by the time the water in its centrifugal flow has reached the gap between the rugose annuli, it has been degassed so that cavitation bubbles are rich in water vapor and have no cushion of noncondensables. Gas ionization in the bubbles due to discharges between the electrodes creates species such as OH radicals and ozone by water electrolysis that are deadly to microbes. Ozone and free radicals are thoroughly mixed into the water by the very high turbulence between the impellers. In von Karman swirling flow, with a shrouding wall across the gap between the counter-rotating impellers, the turbulence at the periphery is estimated at $Re=10^6$.

Upstream of the rugose annuli at the periphery of the workspace, the shearing spiral runners 6 and the action of the counter-rotating disk impellers 4,5 create a spoke-like array of radial vortices to provide sink flow conduits for evolved noncondensables and volatiles to be sucked through the axial exhaust port to axial extraction. The axial suction pump assists in axial extraction of gases, and the radially inward advection due to the vortex wall interaction and the collapse of helical cavitation bubbles also provides means for axial extraction of gases. Degassing deodorizes the water and removes cushioning noncondensables from cavitation bubbles, so that their collapse is very sudden and no energy is wasted in compressing noncondensables.

Residence time is long for feed in the high shear and pulsed electric fields of the radial workspace. For example, in a device having an impeller diameter of 1 meter and a separation of 3 cm, the volume between the impellers is 94,248 cc. If there is a continuous flow through the device from the feed inlet 2 to the periphery 9 of 1 liter/sec (1000 cc/sec) the residence time for a liter of feed will be over 94 seconds. A person pedaling with a work output of 200 watts for that time would input energy to that liter amounting to 18.8 kJ. This work serves to organize turbulence in the shear layer and push a slow net radially outward flow through the processing zone to the periphery. The duration of residence time and volume of feed flow are determined by adjustable elements of the design, such as the impeller speed, radius, and separation.

A pinch 7, where the impellers come to close separation, serves to increase residence time, to increase pressure between the rugose annuli 8 for causing energetic collapse of cavitation bubbles, and to provide means for atomizing the flow out of the periphery 9. Periodic shear cavitation and/or pulsed electric fields for field water purification are created between the rugose annuli of exactly counter-rotating impellers, as in the preferred embodiment shown in FIG. 1 and FIGS. 4*a* and 4*b*, or of a single rotating impeller and a static casing (which is still a counter-rotating situation as defined herein, although not exactly counter-rotating), as in the alternative embodiments shown in FIGS. 6 and 7.

Preferably, suitable means downstream of the present invention filter the suspended solids, including mud and the microbe remains, and crystallized or agglomerated solids, from the water coming out of the periphery. This could also be in the form of a slanted filter for the spray into the holding tank shown in FIGS. 6 and 7. Many suitable means are known to the art.

Arsenic, mercury, and other suspended metals in the feed are inductively repulsed from the periphery by the fluctuating magnetic fields there. Lenz's law traps them in the workspace while water, which is nonconductive, flows through the periphery. Tumbling during a long residence time in the turbulent radial workspace, the suspended metal particles collide and cohere into chunks. The shear layer expels chunks, which are dense and therefore centrifugated by vortices, into the laminar boundary layer against the centrifugal impellers 4,5. In the boundary layer, the chunks receive a momentum boost from the impellers. When their momentum becomes sufficient, due to their high mass, to pass them through the inductive repulsion that traps smaller conductive particles, the chunks of suspended metals are ejected from the periphery along with the water. Agglomerated into chunks, they are easily separable from the water by conventional means downstream.

Nonconductive suspended solids, including salts and precipitate of scale forming compounds such as calcium carbonate and calcium sulfate, also agglomerate in the reactor until reaching a sufficient mass that momentum transfer from the impellers can push them through the turbulence at the periphery. Solutions are repelled from the periphery by Lorentz force on their ions, but water can pass through. Therefore the solution concentrates to saturation in the reactor and crystallizes. Nucleated crystals grow from the ions in the incoming feed and agglomerate by collisions in the turbulent workspace. Eventually, crystals reach a size where their momentum carries them through the periphery. Such large crystals are easily separable by conventional means downstream.

Ionic liquids, such as brine, are repelled from the periphery by Lorentz force on their ions. Also, brine is a conductive fraction and therefore, like metals, is repelled by Lenz's law. Therefore solutions concentrate to saturation in the reactor as their nonconductive solvent, pure water, flows freely out of the periphery. Crystals form and agglomerate, and eventually are expelled at the periphery in easily filterable chunks.

Feed could be cooling water, reverse osmosis feed, brine, milk, or chemical mixtures. The reactor treats them all the same.

Chemical mixtures are churned in high turbulence and mix thoroughly. Gaseous products of reactions are axially extracted continuously through the axial exhaust port 13. Cavitation provides for gas evolution and local enthalpy spikes for crystallization. Inductive repulsion of solutions, by Lorentz force, traps solutions in the turbulent workspace, while solvent is continuously extracted through the periphery. The solution crystallizes, and the crystals are able to escape along with the solvent. Fine crystals of reaction products can be filtered or otherwise separated from the solvent expelled and atomized at the periphery. Fine crystal production in a continuous process is especially useful for pharmaceuticals.

Milk is churned and cream is axially extracted through the axial exhaust port. Pathogens are killed by cavitation and pulsed electric fields. Cavitation assists agitation of the milk and aggregation of suspended solids. Oxygen and dissolved gases are axially extracted.

Brine, including seawater and reverse osmosis reject brine, is very conductive, and therefore inductive repulsion from the periphery powerfully confines brine to the turbulent workspace between the counter-rotating oppositely charged centrifugal impellers. Fresh water, which is nonconductive, is not repelled and passes through the periphery. Therefore the brine becomes saturated and crystallizes in the workspace. Collisions between crystals and accretion from the ions in the incoming feed grow the salt crystals to a size such that they are expelled from the shear layer and into the laminar boundary layer against the centrifugal impellers, where they receive a momentum boost. If they are massive enough, their momentum is sufficient for them to batter through the periphery despite the inductive repulsion of the envelope of brine surrounding them. Evaporative cooling of the atomized spray out of the periphery assists crystallization. The salt crystals become of sufficient size that they are easily separable from water by conventional means downstream.

Reverse osmosis feed and cooling water are both polluted by scale-forming compounds, such as calcium carbonate, and microorganisms which may cause biofouling. The microorganisms are killed and agglomerated into sludge chunks, and the scale-forming compounds are crystallized in the reactor. Solutions, which are conductive fractions, are repelled from the periphery by the fluctuating magnetic fields and the turbulent motion of ions in these fields. Non-ionic fresh water passes freely through the periphery. Being inverse solubility salts, scale-forming compounds are precipitated by cavitation, which causes local enthalpy spikes in the solution. Continuous axial extraction of carbon dioxide favors the forward precipitation reaction. Scale crystals are expelled from the shear layer due to their density and enter the laminar boundary layers against the centrifugal impellers, along with the chunks of biological matter, rust, etc. Crystallized scale and other large suspended solids are easily separable from the cooling water or reverse osmosis feed by suitable means downstream.

Sterilized soil and sludge collected downstream of the reactor is a valuable product. By using sterilized soil, which has all the nutrients of soil without the biological activity of pathogens and parasites, seeds and sprouts are able to grow in ideally disease-free conditions. The soil produced by the present invention is even cleaner than that produced by conventional methods such as oven heating, because even bacteria and viruses have been inactivated in the electromechanical maelstrom upstream of the filter.

Cascading of devices according to the present invention, such that the output (through the periphery 9) of one becomes, after filtration or other conventional separation, the input of a successive device in the cascade, would provide any degree of water purity required.

OBJECTS AND ADVANTAGES OF THE INVENTION

The present invention is useful in the following ways, among others:

1. Improved atomizing of process water, cooling water, and wastewater.

The high shear between the closely separated rapidly rotating counter-rotating impellers at the periphery, plus the pressure built up in the workspace by the work of the centrifugal pumps, rips the water into a spray having a large surface area. The periphery 9 of the processor is a dynamic nozzle. This is good for evaporative cooling and for evolution of residual gases. The dynamic nozzle shear is better for atomization than static nozzle shear because less pressure is necessary and mist droplets are very fine.

2. Solving the problem of gas stripping for process water and wastewater reclamation with an inexpensive and high-throughput mechanical degassing device.

The present invention is a very simple device for practicing continuous degassing without added chemicals, and it is easily scalable to process large flows, such as municipal wastewater, to remove odorants and dissolved gases, such as ammonia, methane, chlorine, cyanide, and nitrogen. The advantage over chemical or biological treatment is that a multitude of noxious constituents are stripped at once, there is no long hold-up while chemicals or microbes do their work, and the area occupied by the reactor is small. Also, there is no expense for chemicals.

3. Providing an alternative to the use of chlorine as a disinfectant and providing means for extracting residual chlorine from water.

Disinfection by electroporesis and cavitation avoids the expense and disinfection byproducts associated with chemical treatment. Residual chlorine may cause chloroform in the water. Chlorine is ineffective against cysts, and its use should be phased out. But for those plants still using chlorine as a disinfectant, cavitation provides means for evolving residual chlorine from wastewater discharges and the highly turbulent shear layer in the workspace 3, organized with sink flow conduits in the form of radial vortices communicating with an axial suction pump 14, extracts evolved chlorine. The shear atomization at the periphery 9 rips the discharged wastewater into droplets which provide a large surface area for chlorine evolution into the atmosphere. Thus wastewater discharges are not polluted by residual chlorine, which might, combining with methane downstream, create chloroform or other disinfection byproducts.

4. Providing means for cracking noxious compounds, such as nitrous oxide, ammonia, hydrogen sulfide, methane, and volatile organic compounds, which may be present in water.

Harmful constituents crack electrolytically between the highly charged opposed shearing electrodes of the present invention. Hydrogen and other gaseous products of electrolysis are sucked away from the electrodes and out of the reactor through the radial shear layer, and axially extracted. Even trace amounts can be treated in this way. An advantage of the present invention is that residence time in the reactor is long, so cracking and axial extraction of gaseous products has a long time to work.

5. Applying von Karman swirling flow to degassing problems, to suspended metals extraction, to scale crystallization, to electrolysis, and to mixing of disinfectants with water.

The very high turbulence (Re $\sim 10^6$) of von Karman swirling flow is excellent for mixing. The fractal turbulence provides a tree network of low pressure gradients for the evolution and axial extraction of dissolved noncondensables and VOCs. The organization of open system von Karman swirling flow provides means for excellent fluid separation. The radial counterflow forcing regime disclosed in the present invention provides simple and effective means for degassing, mixing of OH radicals, agglomeration of suspended metals and scale-forming compounds, and long residence time.

6. Providing a simple and high-throughput reactor for physical water disinfection using the combined effect of UV radiation, cavitation, and electrical energy.

Without the use of added chemicals, drinking water, cooling water, and reverse osmosis feed are cleansed of pathogens and microorganisms which cause biofouling. An advantage of the present invention is that the expense of chemicals and the danger of disinfection byproducts is avoided. Another advantage is that at the same time that disinfection is taking place, demineralization by cavitation-assisted crystallization is aggregating scale-forming dissolved solids into easily separable chunks. The reactor has a long residence time, so disinfection and crystallization has ample time. The process is continuous, and easily scalable to large flows without sacrificing residence time. The device is simple and requires only moderate power expenditure, which could be provided by a human pedaling a bicycle. The present invention has many advantages over the complicated, expensive, and high pressure field water purification devices known to the art.

7. Providing means for preventing electrode erosion in an electrohydraulic reactor.

Electrode erosion by arcing is prevented by shearing DC electrodes. Arc ends are continuously moved apart so that arcs extinguish quickly. Although the electric field between the electrodes may be large, the turbulence in the medium through which the arcs must propagate protects against arcing. A turbulent corona nucleates a multitude of electrohydraulic cavitation bubbles, and the organized turbulence in the reactor sucks evolved noncondensable gases out of the fluid, so cavitation bubble collapse becomes very energetic.

8. Solving the problem of power dissipation by locating the UV light sources close to pathogens.

Cavitation produces UV light in close proximity to the target pathogens because cavitation nucleates at weak points in the water structure, which is where suspended solids are. Because the UV light source is close to the target, the energy transfer into the target by high energy photons is maximally effective. Dissipation of power in the water between the light source and the target is minimal because the target is so close.

9. Providing means for continuous crystallization in a simple reactor, for cooling water or reverse osmosis feed demineralization on a large scale, and for pharmaceutical and other chemical synthesis.

The present invention discloses a continuous shear reactor for crystallization. An advantage is that solvent is continuously extracted through the periphery 9 and gases such as carbon dioxide are continuously extracted axially through organized turbulence in the shear layer of the radial workspace 3. The solution trapped in the workspace by inductive repulsion at the periphery loses solvent through the periphery and thus becomes saturated and crystallizes in high turbulence, in a reactor having a long residence time. Cavitation (shear and/or electrohydraulic) assists gas evolution and provides local enthalpy spikes for causing crystallization of inverse solubility salts. High turbulence in the workspace, and the momentum boosts to nucleated crystals due to nearby cavitation, assist secondary crystallization. Scale-forming compounds, such as calcium carbonate and calcium sulfate, crystallize into large chunks which are easily separable downstream by suitable means known to the art.

Pharmaceutical compound crystallization could also be accomplished in the reactor disclosed by the present invention. In the same way that dissolved solids are precipitated, by extracting the solvent through the periphery while axially extracting the gases, chemical mixtures could be turbulently mixed and the solid products crystallized into small crystals.

10. Providing non-chemical means for oxidation and agglomeration of suspended metals, so they can be effectively filtered and recovered downstream.

In addition to crystallizing scale-forming compounds, and also killing pathogens and biofouling microorganisms, the same shear reactor also provides means for removing suspended metals such as arsenic and mercury. Inductive repulsion from the periphery traps the suspended metals in the turbulent workspace, where they collide and aggregate until reaching a size such that momentum transfer from the centrifugal impellers overcomes inductive repulsion and expels the agglomerated metal chunks from the periphery, along with the purified water. Downstream, the chunks are easily separable from the water by suitable means known to the art.

11. Providing simple means for physical field water purification, not requiring chemical additives, membranes, and high power expenditure.

Even a human pedaling a bicycle, a wind turbine, or a truck tire turned by an internal combustion engine, can provide means for driving the simple device disclosed in the present invention. The prime mover can provide the electrical effects as well as the shear and mechanical effects which separate and disinfect a water supply. There are no pores to clog, no chemicals to buy, and no complicated high pressure parts to service. That is a significant advantage in situations, such as battlefields or other disaster sites, where potable water supply is critical.

12. Providing means for economical high throughput disinfection of sludge and sediment.

Mud and sludge is cleansed by cavitation and electroporesis, killing even resistant cysts sheltering among sediment. The pulsed electric fields seek out any conductive constituents in the feed, which include biological fluids. Currents though these fluids breach cell walls and cause cavitation in the water nearby. Cavitation due to shear and pulsed electric fields causes very energetic implosions near the cysts. UV radiation, microjets, and shock waves kill or inactivate pathogens. The high shear between the counter-rotating centrifugal impellers at the periphery 9 and the high turbulence inside the reactor cause suspended silt and clay and biological material to collide and shear thicken into chunks which are easily separable by suitable means downstream.

13. Providing means for economical and high throughput continuous electromechanical desalination of seawater, reverse osmosis reject brine, and produced brine from oil and gas wells.

Inductive repulsion of brine from the periphery, by the pulsed electric fields of the present invention, traps brine in the turbulent workspace while fresh water (which is nonconductive and therefore not subject to inductive repulsion) flows out of the periphery. Extraction of solvent in this manner concentrates the brine to saturation in the workspace, and nucleated salt crystals grow and agglomerate in secondary crystallization due to the high turbulence of the workspace. When the crystals reach a sufficient size that the momentum boost from the centrifugal impellers is enough to get them through the inductive repulsion, they go out of the periphery. Brine feed flows continuously in at the axis while solvent and large crystals flow continuously out of the periphery. Shear atomization at the periphery provides a large surface area for evaporative cooling and further crystallization of salt in the droplets. The output of the periphery of the device is easily separable by suitable means downstream to recover salt crystals and potable water.

Inductive repulsion of brine from the periphery is strong because the electric fields between the centrifugal impellers are pulsing and strong. Ions are repelled from the periphery due to Lorentz force caused by their motion in turbulence and the fluctuations of the magnetic field there. Electrode erosion by arcing is prevented by shear between the electrodes, giving audio frequency pulsing and a turbulent corona emanating a strong fluctuating magnetic field at the periphery. The rate of energy transfer into the brine is high because the opposite charges on the plates of the dynamic capacitor bounding the workspace are large, and short circuiting of electrical energy through arcing is minimized by shear between the electrodes.

14. Providing means for disinfecting milk, other beverages, and food product slurries.

Pulsed electric fields and cavitation kill the pathogens. Cavitation is effective because the ultraviolet light emitted by collapsing cavitation bubbles occurs very near the target pathogens. Shock waves and microjets crush the pathogens. Electroporesis kills them too. This is a continuous process, not batch, and it does not rely on chemical additives or heating to kill the pathogens. It is easily scalable to handle large flows.

15. Providing means for continuous nonthermal petroleum cracking and separation.

Sand, tar, and mud, which are nonconductive and dense, are expelled from the periphery along with fresh water. Gas and light fractions, which are less dense, are axially extracted. Produced brine is crystallized as previously described, and the water and crystals go out the periphery with the sand, etc. Between the shearing electrodes, heavy fractions are cracked into light fractions by the pulsed electric fields. The process is continuous, and may be used for simple wellhead processing to produce fresh water, salt crystals, and light hydrocarbons unburdened by heavy fractions.

From the foregoing list, it should be clear that the simple device disclosed in the present invention is useful in solving a number of problems in various fields of use. Therefore the following claims are generally drawn to the device itself and are not limited by fields of use. Other fields of use than those mentioned here are also intended to be covered by the present invention, as well as such equivalents and modifications as may be obvious to those of ordinary skill in the arts to which the invention pertains. The mention of specific fields of use and specific embodiments is not intended to exclude others not mentioned.

The applicants claim:

1. A method of continuous electromechanical crystallizing of a solute from a solution, comprising the simultaneous steps of
    introducing solution through an axial feed port into a radial workspace between counter-rotating centrifugal impellers,
    sucking evolved gases out of the workspace through an axial exhaust port,
    causing opposite charges on opposing electrodes of the impellers across the workspace, and
    expelling solvent and crystals from the periphery of the workspace.

2. The method of claim 1, wherein the flow out of the periphery is atomized.

3. The method of claim 1, plus the additional step of filtering the flow out of the periphery to recover crystals.

* * * * *